(12) United States Patent
Takebe et al.

(10) Patent No.: US 7,709,572 B2
(45) Date of Patent: May 4, 2010

(54) OPTICAL FILM, POLARIZING PLATE AND DISPLAY DEVICE USING THE SAME, AND MANUFACTURING METHOD THEREOF

(75) Inventors: Takashi Takebe, Kanagawa (JP); Masataka Takimoto, Tokyo (JP); Nobuo Kubo, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 12/245,068

(22) Filed: Oct. 3, 2008

(65) Prior Publication Data

US 2009/0099308 A1  Apr. 16, 2009

(30) Foreign Application Priority Data

Oct. 13, 2007 (JP) ............................. 2007-267288
Nov. 22, 2007 (JP) ............................. 2007-302864
Dec. 21, 2007 (JP) ............................. 2007-329858
Mar. 27, 2008 (WO) ................. PCT/JP2008/055871

(51) Int. Cl.
*C08B 37/00* (2006.01)

(52) U.S. Cl. ................................. 525/54.21; 526/348.1

(58) Field of Classification Search ................. 428/532, 428/533
See application file for complete search history.

(56) References Cited

U.S. PATENT DOCUMENTS

2006/0280882 A1* 12/2006 Oka et al. ................... 428/1.31

2007/0282038 A1* 12/2007 Bhattacharya et al. ........ 524/31
2008/0023881 A1*  1/2008 Kubo .......................... 264/299

FOREIGN PATENT DOCUMENTS

| JP | 5119217 | 5/1993 |
| JP | 2002356658 | 12/2002 |
| JP | 2003012859 | 1/2003 |
| JP | 2007062055 | 3/2007 |
| JP | 2007231157 | 9/2007 |

* cited by examiner

*Primary Examiner*—Ling-Siu Choi
*Assistant Examiner*—Sonya Wright
(74) *Attorney, Agent, or Firm*—Lucas & Mercanti, LLP

(57) ABSTRACT

The present invention is to provide an optical film which exhibits low hygroscopicity, high transparency, high heat resistance and markedly lowered brittleness, and particularly to provide an optical film which is appropriately employed as a polarizing plate protective film for large liquid crystal display devices and outdoor liquid crystal display devices. The above optical film is characterized in that acrylic resin (A) and cellulose ester resin (B) are incorporated at a weight ratio of 95:5-30:70, weight average molecular weight Mw of aforesaid acrylic resin (A) is at least 80,000, total substitution degree (T) of the acyl group of aforesaid cellulose ester resin (B) is 2.0-3.0, the substitution degree of the acyl group having 3-7 carbon atoms is 1.2-3.0, and weight average molecular weight Mw of aforesaid cellulose ester resin (B) is at least 75,000. It is characterized that the total substitution degree of the acyl group other than carbon atoms of 3-7 of the cellulose ester resin (B) is at most 1.3.

17 Claims, 1 Drawing Sheet

OPTICAL FILM, POLARIZING PLATE AND DISPLAY DEVICE USING THE SAME, AND MANUFACTURING METHOD THEREOF

This Application claims the priority of each of the following Applications Japanese Patent Application No. 2007-267288 filed on Oct. 13, 2007, Japanese Patent Application No. 2007-302864 filed on Nov. 22, 2007, Japanese Patent Application No. 2007-329358 filed on Dec. 21, 2007, and International Application No. PCT/JP2008/055871 filed on Mar. 27, 2008; and the entire content of each of the Applications are hereby incorporated by reference.

BACKGROUND OF THE INVENTION

The present invention relates to an optical film and in more detail to an optical film which exhibits low hygroscopicity, high transparency, high heat resistance, and markedly lowered brittleness via blending of specified acrylic resins and cellulose ester resins.

Demand for liquid crystal display devices is increasing in applications to liquid crystal TV sets and liquid crystal displays of personal computers. Commonly, a liquid crystal display device is composed of a liquid crystal cell in which a transparent electrode, a liquid crystal layer, and a color filter are sandwiched between glass plates, and two polarizing plates are provided on both sides. Each polarizing plate is constituted in such a way that a polarizer (hereinafter also referred to as a polarizing membrane or a polarizing film) is sandwiched between two optical films (namely polarizing plate protective films) As the above polarizing plate protective film, commonly employed is a cellulose triacetate film.

On the other hand, due to recent technical progress, liquid crystal display devices are increasing in size, and simultaneously, application of liquid crystal display devices is diversifying. Examples thereof include an application as a large display installed along streets and at shops as well as an advertisement display in public places employing display equipment called digital signage.

In the above applications, since an outdoor application is assumed, deterioration due to moisture absorption of the polarizing film results in problems, whereby higher moisture resistance of the polarizing plate protective film has been sought. However, it has been difficult to realize sufficient moisture resistance by employing conventional cellulose ester films such as a cellulose acetate film. When the film thickness is increased to realize desired moisture resistance, problems have occurred in which optical effects become great. Further, in recent years, a decrease in thickness of these devices is demanded, whereby any increase in thickness of the polarizing plate has caused problems.

On the other hand, as a material of a low moisture absorptive optical film, polymethyl methacrylate (hereinafter abbreviated as PMMA) has been appropriately employed due to its excellent transparency and dimensional stability, in addition to low hygroscopicity.

However, as described above, along with a large increase of liquid crystal display devices and an increase in their outdoor application, in order to enable sufficient recognition of outdoor images, it is necessary to increase the light amount of backlights and at the same time, they are employed under more severe conditions, whereby heat resistance at higher temperatures and over extended periods has been sought.

However, PMMA film exhibits low heat resistance. When employed at a relatively high temperature over an extended period, problems have occurred in which the film shape is modified.

The above problems have been not only for physical properties of film itself, but also more serious ones for polarizing plates and display devices which employ the above film. Namely, in a liquid crystal display device, the polarizing plate curls along with deformation of the film, whereby problems have occurred in which the entire panel suffers from curling. Problems due to film deformation occur also on the backlight side. When employed in the position of the surface of the visible side, the designed retardation difference is modified, whereby problems occur in which the view angle fluctuates and colors shift.

Further, when an acrylic resin film is compared to cellulose ester films, the acrylic resin film is more fragile and more brittle to result in handling difficulty, whereby it has been difficult to stably manufacture optical films, especially for large-sized liquid crystal display devices.

To overcome the above problems, a method is proposed in which polycarbonate (hereinafter referred to as PC) is added to acrylic resins. Due to limitations in employable solvents and insufficient mutual compatibility of the used resins, while turbidity tends to result, whereby it has been difficult to employ it as an optical film (refer, for example, to Patent Document 1)

As other methods to improve heat resistance, disclosed is a method in which an alicyclic alkyl group is introduced as a copolymerization component of the acrylic resin, as well as a method in which a ring structure is formed in the molecular primary chain via an intramolecular ring forming reaction (refer, for example, to Patent Documents 2 and 3).

These methods improved heat resistance but did not realize film which exhibited targeted brittleness, whereby it was difficult to manufacture an optical film employable in a large-sized liquid crystal display device. Further, the resulting brittleness is not sufficiently low, and the optical film tended to deform the panel, and it was not possible to reduce the variation of retardation, whereby problems of fluctuation of the view angle and color shift occurred.

As a technique to improve moisture resistance and heat resistance, proposed are resins in which acrylic resins are combined with impact resistant acryl rubber-methyl methacrylate copolymers and modified acetyl cellulose (refer, for example, to Patent Document 4).

However, even by employing the above method, the brittleness was not sufficiently lowered as desired, and handling properties were insufficient to manufacture an optical film employed in a large-sized liquid crystal display device. Further, haze due to mixed components was generated and when employed in an outdoor setting where a higher contrast was required, problems occurred in which image contrast was lowered.

In addition, a technique is proposed in which, with regard to conventional cellulose ester film, acrylic resins are blended to control plasticizers and optical characteristics (refer, for example, to Patent Document 5).

However, in these objects, acrylic resins are not added in an amount which sufficiently enhances moisture resistance, whereby sufficient moisture resistance is not realized. Accordingly, under a high humidity ambience, problems have occurred in which polarizing plates deteriorate and optical values of optical films vary. Further, it is commonly assumed that when a large amount of other resins is added to cellulose esters to enhance moisture resistance, transparency is reduced. Accordingly, no cellulose ester film has been produced in which moisture resistance is enhanced so that under a high humidity ambience, optical values remain stable.

Under the above situations, along with recent expansion of application of liquid crystal display devices, problems of employed optical films such as low hygroscopicity, transparency, high heat resistance, or brittleness have increasingly pronounced and improvements have been sought.

(Patent Document 1) Japanese Patent Publication Open to Public Inspection (hereinafter referred to as JP-A) No. 5-306344

(Patent Document 2) JP-A No. 2002-12728

(Patent Document 3) JP-A No. 2005-146084

(Patent Document 4) JP-A No. 5-119217

(Patent Document 5) JP-A No. 2003-12859

SUMMARY OF THE INVENTION

Accordingly, in view of the foregoing, the present invention was achieved. An object of the present invention is to provide an optical film which exhibits low hygroscopicity, high transparency, high heat resistance, and markedly lowered brittleness.

Specifically, an object of the present invention is to provide an optical film which is appropriately employed as a polarizing plate protective film in large size and outdoor use liquid crystal display devices.

The above problems of the present invention are solved via the following embodiments.

1. An optical film wherein an acrylic resin (A) and a cellulose ester resin (B) are incorporated in a compatible state at a weight ratio of 95:5-30:70, average molecular weight Mw of aforesaid acrylic resin (A) is at least 80,000, total substitution degree (T) of the acyl group of aforesaid cellulose ester resin (B) is 2.0-3.0, the substitution degree of the acyl group having 3-7 carbon atoms is 1.2-3.0, and weight average molecular weight Mw of aforesaid cellulose ester resin (B) is at least 75,000.

2. The optical film, described in 1. above, wherein the sum of the substitution degrees of the acyl group having carbon atoms other than 3-7 of aforesaid cellulose ester resin (B) is at most 1.3

3. The optical film, described in 1. or 2. above, wherein the sum of the substitution degree of the acyl group having carbon atoms other than 3-7 carbon of aforesaid cellulose ester resin (B) is at least 2.00.

4. The optical film, described in any one of 1.-3. above, wherein total substitution degree (T) of the acyl group of aforesaid cellulose ester resin (B) is 2.5-3.0.

5. The optical film, described in any one of 1.-4. above, wherein aforesaid acrylic resin (A) is an acrylic resin which incorporates methyl methacrylate units of 50-99% by weight in the molecule.

6. The optical film, described in any one of 1.-5. above, wherein the weight ratio of aforesaid acrylic resin (A) and cellulose ester resin (B) is in the range of 95:5-50:50.

7. The optical film, described in 6. above, wherein the weight ratio of aforesaid acrylic resin (A) and cellulose ester resin (B) is in the range of 80:20-60:40.

8. The optical film, described in any one of 1.-7. above, wherein weight average molecular weight Mw of aforesaid acrylic resin (A) is in the range of 80,000-1,000,000.

9. The optical film, described in 8. above, wherein weight average molecular weight Mw of aforesaid acrylic resin (A) is in the range of 100,000-500,000.

10. The optical film, described in 9. above, wherein weight average molecular weight Mw of aforesaid acrylic resin (A) is in the range of 150,000-400,000.

11. The optical film, described in any one of 1.-10. above, wherein weight average molecular weight Mw of aforesaid cellulose ester resin (B) is in the range of 75,000-300,000.

12. The optical film, described in 11. above, wherein weight average molecular weight Mw of aforesaid cellulose ester resin (B) is in the range of 100,000-240,000.

13. The optical film, described in any one of 1.-12. above, wherein the aforesaid optical film incorporates acryl particles (C) in an amount of 0.5-30% by weight with respect to the total weight of the resins constituting the aforesaid film.

14. The optical film, described in any one of 1.-13. above, wherein the film thickness is 20-200 μm and it is employed as a polarizing plate protective film.

15. A polarizing plate comprising the optical film described in any one of 1.-14. above.

16. A liquid crystal display device comprising the optical film described in any one of 1.-14. above.

17. A method for producing the optical film described in any one of 1.-14. above, comprising a step of:
casting a dope comprising acrylic resin (A), cellulose ester resin (B) and a solvent.

EMBODIMENTS

The present invention enables to provide an optical film which exhibits low hygroscopicity, high transparency, high heat resistance, and markedly lowered brittleness.

Specifically, it is possible to provide an optical film which is appropriately employed as a polarizing plate protective film employed in large liquid crystal display devices and digital signage liquid crystal display devices.

Figure 1:
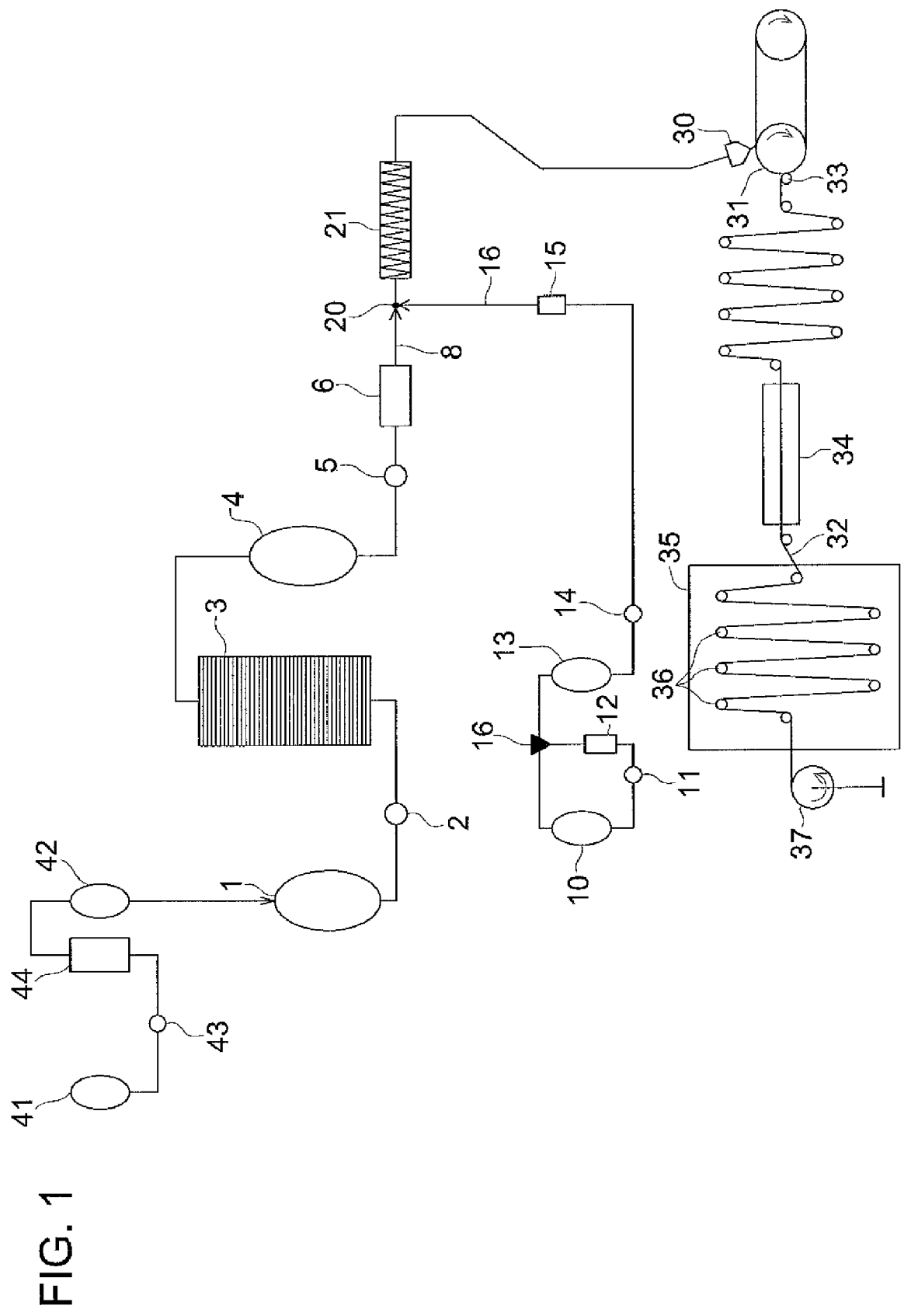
FIG. 1 is a schematic view of an example of a dope preparing process, a casting process, and a drying process of the solution casting film preparing method employed in the present invention.

DESCRIPTION OF THE NUMERALS 1 dissolving kettle
3, 6, 12, and 15 filters
4 and 13 stock kettles
5 and 14 liquid transporting pumps
8 and 16 circuit pipes
10 UV absorber mixing kettle
20 junction pipe
21 mixer
30 die
31 metal support
32 web
33 peeling position
34 tenter apparatus
35 roll dryer
41 particle preparing kettle
42 stock kettle
43 pump
44 filter Optimal embodiments to practice the present invention will now be detailed, however the present invention is not limited thereto.

Heretofore, as polarizing plate protective film, commonly employed has been a cellulose ester film. However, such cellulose ester film exhibits disadvantage of high hygroscopicity, compared to acryl film. When hygroscopicity is lowered by blending cellulose ester resins and acrylic resins, haze increases due to lack of mutual compatibility, whereby it has been difficult to employ the resulting mixture as an optical film. Specifically, it is assumed that high molecular weight acrylic resins are not compatible with cellulose ester resins, and thus lowering hygroscopicity via resin blending is difficult. Patent Document 5 describes the addition of relatively low molecular weight acrylic resins to cellulose ester resins. However, hygroscopicity is not improved due to the small amount of the addition. In addition, heat resistance is lowered due to the addition of relatively low molecular weight acrylic resins, whereby it has been impossible to realize characteristics which are suitable as an optical film employed in large or outdoor liquid crystal display devices.

On the other hand, an acrylic resin film exhibits poor heat resistance, and during use at relatively high temperature and over extended use, the shape tends to vary and to also result in relatively high brittleness. Patent Documents 1-3 describe improvements of characteristics of acrylic resins, however targeted characteristics as an optical film have not been fully realized. In Patent Document 3, a technique to enhance heat resistance of acrylic resins is invented by blending cellulose ester resins. However, since it is assumed that relatively high molecular weight cellulose ester resins are not compatible with acrylic resins, relatively low molecular weight cellulose ester resins are incorporated. As a result, targeted brittleness has not been sufficiently realized.

On the other hand, the inventors of the present invention conducted investigations and discovered that a cellulose ester resin of a specified substitution degree exhibited high compatibility with an acrylic resin of a specified molecular weight. Further, it was discovered that amazingly, it was possible to make a relatively high molecular weight cellulose ester resin compatible without an increase in haze.

As a result, by achieving compatibility of acrylic resin (A) and cellulose ester resin (B) at the specified blending ratio, drawbacks of each of the acrylic reins and cellulose ester resins were overcome, and it was discovered that it was possible to prepare an optical film which exhibited low hygroscopicity, high transparency, high weather resistance, and markedly lowered brittleness, whereby the present invention was achievable.

Namely, by employing such optical film, characterized in that acrylic resin (A) and cellulose ester resins are incorporated in a compatible state at a weight ratio of 95:5-30:70, weight average molecular weight Mw of aforesaid acrylic resin (A) is at least 80,000, degree of total substitution (T) of the acyl group of aforesaid cellulose ester resin (B) is 2.0-3.0, the substitution degree of the acyl group having 3-7 carbon atoms is 1.2-3.0, and weight average molecular weight (Mw) of aforesaid cellulose ester resin (B) is at least 75,000, it is possible to prepare an optical film which exhibits low hygroscopicity, high transparency, high heat resistance, and markedly low brittleness.

A further preferable constitution is that the above optical film incorporates acryl particles (C) in an amount of 0.5-30% by weight with respect to the total weight of the resins constituting the aforesaid film.

Specifically, by applying the above optical film to at least one side of a polarizing plate, it is possible to prepare a liquid crystal display device in which fluctuation of view angle, and color shift are lowered.

The present invention will now be detailed.

(Optical Film)

<Acrylic Resin (A)>

Acrylic resins employed in the present invention include methacrylic resins. These resins are not particularly limited, and preferred resins include those which are composed of methyl methacrylate units of 50-99% by weight and other monomer units of 1-50% by weight which are copolymerizable with the above.

Other copolymerizable monomers include α,β-unsaturated acids such as alkyl methacrylate, in which the number of carbon atoms of the alkyl group is 2-18, alkyl acrylate, in which the number of carbon atoms of the alkyl group is 1-18, acrylic acid, or methacrylic acid; unsaturated groups containing divalent carboxylic acids such as maleic acid, fumaric acid, or itaconic acid; aromatic vinyl compounds such as styrene or α-methylstyrene; and α,β-unsaturated nitrites such as acrylonitrile or methacrylonitrile; as well as maleic anhydride, maleimide, N-substituted maleimide, and glutaric anhydride. These may be employed individually or in combinations of at least two types.

Of these, in view of heat-decomposition resistance and fluidity of copolymers, preferred are methyl acrylate, ethyl acrylate, n-propyl acrylate, n-butyl acrylate, s-butyl acrylate, and 2-ethylhexyl acrylate, and methyl acrylate and n-butyl acrylate are particularly preferred to be employed.

Specifically, in view of a decrease in brittleness as an optical film and improvement of transparency when compatibilized with cellulose ester resin (B), the weight average molecular weight (Mw) of acrylic resin (A), employed in the present invention, is at least 80,000. when the weight average molecular weight (Mw) of acrylic resin (A) is at most 80,000, brittleness is not sufficiently lowered and compatibility with cellulose ester resin (B) deteriorates. The weight average molecular weight (Mw) of acrylic resin (A) is more preferably in the range of 100,000-600,000, but is most preferably in the range of 150,000-400,000. The upper limit of the weight average molecular weight (Mw) of acrylic resin (A) is not particularly limited, but in view of its production, a preferred embodiment is that the upper limit is at most 1,000,000.

It is possible to determine the weight average molecular weight of acrylic resins of the present invention via gel permeation chromatography. Measurement conditions are as follows.

Solvent: methylene chloride
Columns: SHODEX K806, K805, and K803G (produced by Showa Denko K. K., three columns were employed via connections)
Column temperature: 25° C.
Sample concentration: 0.1% by weight
Detector: RI Model 504 (produced by GL Sciences Inc.)
Pump: L6000 (produced by Hitachi Ltd.)
Flow rate: 1.0 ml/minute
Calibration curve: A calibration curve prepared by employing 13 samples of standard polystyrene STK (produced by Tosoh Corp.) was employed. It is preferable to employ the 13 samples at nearly equal intervals.

The manufacturing methods of acrylic resin (A) in the present invention are not particularly limited, and employed may be any of the conventional methods such as suspension polymerization, emulsion polymerization, bulk polymerization, or solution polymerization. As a polymerization initiator, employed may be common peroxide based and azo based ones. Further, redox based ones may be included. With regard to polymerization temperature, the suspension or emulsion polymerization may be carried out between 30 and 100° C., while the bulk or solution polymerization may be carried out between 80 and 160° C. In order to control the reduction viscosity of the resulting copolymer, polymerization may be carried out employing alkylmercaptan as a chain transfer agent.

As the acrylic resins according to the present invention, also employed may be commercial ones. Examples thereof include DERPET 60N and 80N (both produced by Asahi Kasei Chemicals Co., Ltd.), DIANAL BR52, BR80, BR83, B85, and BR88 (all manufactured by Mitsubishi Rayon Co., Ltd.), and KT75 (produced by Denki Kagaku Kogyo K. K.). Acrylic resins may be employed in combinations of at least two types.

<Cellulose Ester Resin (B)>

Specifically, in view of lowering of brittleness and transparency when compatibilized with acrylic resin (A), it is preferable that total substitution degree (T) of the acyl group is 2.0-3.0, the substitution degree of the acyl group having 3-7 carbon atoms is 1.2-3.0, and the substitution degree of the acyl group having 3-7 carbon atoms is 2.0-3.0. Namely, the cellulose ester resins of the present invention are those substituted with the acyl group having 3-7 carbon atoms. In practice, preferably employed are propionyl and butylyl groups, and the propionyl group is most preferably employed.

When the total substitution degree of the acyl group of cellulose ester resin (B) is at most 2.0, namely, the residual degree of the hydroxyl group at the 2, 3, and 6 positions of the cellulose ester molecule is at least 1.0, acrylic resin (A) and acrylic resin (B) are not sufficiently compatible. As a result, when employed as an optical film, resulting haze is a problem. Further, even though the total substitution degree of the acyl group is at least 2.0, when the substitution degree of the acyl group having 3-7 carbon atoms is at most 1.2, sufficient compatibility is also not realized or brittleness is not lowered. For example, even though the total substitution degree of the acyl group is at least 2.0, the acyl group having two carbon atoms, namely when the substitution degree of the acyl group is high and the substitution degree of the acyl group having 3-7 carbon atoms is at most 1.2, the resulting compatibility is degraded, whereby haze increases. Further, even though the substitution degree of the acyl group is at least 2.0, when the substitution degree of the acyl group having at least 8 carbon atoms is at most 1.2, brittleness is not lowered, whereby targeted characteristics are not realized.

When total substitution degree (T) is 2.0-3.0 and the substitution degree of the acyl group having 3-7 carbon atoms is 1.2-3.0, the acyl substitution degree of cellulose ester resin (B) of the present invention results in no problem. It is preferable that the sum of the substitution degrees of the acyl group having 3-7 carbon atoms, namely the acetyl group and the acyl group having at least 8 carbon atoms is regulated to be at most 1.3.

Further, total substitution degree (T) of cellulose ester resin (B) is more preferably in the range of 2.5-3.0.

In the present invention, the above acyl group may be either an aliphatic acyl group or an aromatic acyl group. The aliphatic acyl group may be straight-chained or branched, and may have substituents. The number of carbon atoms of the acyl group in the present invention includes those in the substituents of the above acyl group.

When above cellulose ester resin (B) incorporates aromatic acyl groups as a substituent, it is preferable that the number of substituents X substituted onto an aromatic ring is 0-5. In this case, it is critical that the substitution degree of the acyl group which has 3-7 carbon atoms including substituents is regulated to be 1.2-3.0. For example, since the number of carbon atoms of a benzoyl group is 7, when having substituents including carbon atoms, the number of carbon atoms as a benzoyl group reaches at least 8, whereby it is not included in the acyl group having 3-7 carbon atoms.

Further, when the number of substituents substituted onto an aromatic ring is at least 2, they may be the same or differ. Further, they may be combined to form condensed polycyclic compounds (for example, naphthalene, indene, indan, phenanthrene, quinoline, isoquinoline, chromene, chroman, phthalazine, acridine, indole, and indoline).

Cellulose ester resin (B), described above, has a structure having at least one aliphatic acyl group having 3-7 carbon atoms. The above structure is employed in the cellulose ester resins of the present invention.

The substitution degree of cellulose ester resin (B) according to the present invention is that total substitution degree (T) of the acyl group is 2.0-3.0, while the substitution degree of the acyl group having 3-7 carbon atoms is 1.2-3.0.

Further, the preferred structure is that the total substitution degree of those other than the acyl group having 3-7 carbon atoms, namely the acetyl group and the acyl group having at least 8 carbon atoms, is at most 1.3.

Cellulose ester resin (B) according to the present invention is preferably one type selected particularly from cellulose acetate propionate, cellulose acetate butyrate, cellulose acetate benzoate, cellulose propionate, and cellulose butyrate. Namely preferred are those having an acyl group having 3-4 carbon atoms as a substituent.

Of these, particularly preferred cellulose ester resins include cellulose acetate propionate and cellulose propionate.

A portion which is not substituted with the acyl group commonly exists as a hydroxyl group. It is possible to synthesize these via common methods known in the art.

The substitution degree of the acetyl group and other acyl groups refers to the value determined by the method specified in ASTM-D817-96.

Specifically, in view of compatibility with acrylic resin (A) and lowering of brittleness, weight average molecular weight (Mw) of the cellulose ester resins according to the present invention is commonly at least 75,000, is preferably in the range of 75,000-300,000, is more preferably in the range of 100,000-240,000, but is most preferably in the range of 160,000-240,000. When average molecular weight (Mw) of cellulose ester resins is at most 75,000, heat resistance is not sufficiently enhanced and brittleness is also not sufficiently lowered, whereby the targeted effects of the present invention are not realized. In the present invention, at least two types of cellulose resins may be employed after blending.

In the optical film of the present invention, acrylic resin (A) and cellulose ester resin (B) are incorporated in a compatible state at a weight ratio of 95:5-30:70. The above ratio is preferably 95:5-50:50, but is more preferably 90:10-60:40.

When the weight ratio of acrylic resin (A) and cellulose ester resin (B) is at least 95:5 in such a manner that the weight ratio of acrylic resin (A) is higher, targeted effects due to cellulose ester (B) are not sufficiently realized. In the above ratio of 30:70, the ratio of the acrylic resin becomes lower, whereby the resulting moisture resistance becomes insufficient.

In the optical film of the present invention, it is essential that acrylic resin (A) and cellulose ester resin (B) are incorporated in a compatible state. Physical properties and qualities demanded as an optical film are realized via mutual compensation by achieving compatibility of the different resins.

It is possible to find whether acrylic resin (A) and cellulose ester resin (B) are in a compatible state, by, for example, glass transition temperature Tg.

For example, when both resins, exhibiting different glass transition temperatures, are blended, at least two glass transition temperatures of the blend co-exist due to the presence of each of the resins. On the other hand, when both resins are compatible, the inherent glass transition temperature of each the resins disappears to result in one glass transition temperature which is the glass transition temperature of the resulting compatible resin.

Glass transition temperature, as described herein, refers to an intermediate point glass transition temperature (Tmg) determined in accordance with JIS K7121 (1987) which is measured at a temperature increasing rate of 20° C./minute, employing a differential scanning calorimeter DSC-7, produced by Perkin Elmer Co.).

Acrylic resin (A) and cellulose ester resin (B) each is a preferably non-crystalline resin, and one of them may be a crystalline polymer or a polymer exhibiting partial crystallinity. In the present invention, it is preferable that acrylic resin (A) and cellulose ester resin (B) are compatible to form a non-crystalline resin.

Weight average molecular weight (Mw) of acrylic resin (A) and weight average molecular weight (Mw) of cellulose ester resin (B), as well as substitution degree are determined in such a manner that after separation employing solubility difference of both resins in solvents, each value is determined. When resins are separated, the compatible resins are added into a solvent which only dissolves one of them and the dissolved resin is extracted, followed by separation. During the above, heating or refluxing may be carried out. Resins may be separated via at least two processes in which these solvents are combined. The residual resin which remains as an insoluble one is separated from a soluble resin via filtration. It is possible to separate the resin via an operation in which the solution containing the extract is dried via evaporation of the solvent. It is possible to identify these separated resins via common structural analysis of polymers. When the optical film of the present invention incorporates resins other than acrylic resin (A) and cellulose ester resin (B), separation may be carried out via a similar method.

Further, when weight average molecular weight (Mw) of compatible resins differs from each other, the higher molecular weight resin is eluted earlier via gel permeation chromatography (GPC), while elution of the low molecular weight polymer takes a longer time, whereby it is possible to easily carry out separation and to determine the molecular weight.

Further, the molecular weight of compatible resins is determined via GPC. At the same time, a resin solution is partially sampled hourly from the eluted resin solution, and the resin which is obtained by distilling out the solvent and drying is subjected to quantitative structural analysis whereby a resin composition of each cutoff of different molecular weight is detect. Thus, it is possible to identify each of the compatible solvents. By determining each of the molecular weight distribution of the resin previously sampled via solubility difference in solvents employing GPC, it is possible to detect each of the compatible resins.

Further, "incorporating acrylic resin (A) and cellulose ester resin (B) in a compatible state", as described in the present invention, refers to such a state that resins (being polymers) are blended to result in a compatible state, and does not include a state in which blended resins are prepared via polymerization after acrylic resin precursors such as monomers, dimers, or oligomers are blended with cellulose ester resin (B).

A process to prepare blended resins via polymerization after blending cellulose ester resin (B) with acrylic precursors such as monomers, dimers, or oligomers, is accompanied with complicated polymerization reactions. Resins prepared by the above method results in difficult reaction control, whereby it becomes difficult to control the molecular weight. Further, when resins are synthesized via the above method, graft polymerization, crosslinking reactions, and ring forming reactions tend to occur, whereby the resulting products are frequently not soluble in solvents and not fusible under heat. As a result, it is difficult to determine their weight average molecular weight (Mw) by eluting an acrylic resin in blended resins. Accordingly, it is difficult to control physical properties, whereby it is not possible to employ those as a resin which enables stable production of optical film.

The optical film of the present invention may be composed of resins other than acrylic resins (A) and cellulose ester resin (B), and additives, as long as its function as an optical film is not adversely affected.

When resins other than acrylic resin (A) and cellulose ester resin (B) are incorporated, added resins may be in a compatible state or may be mixed without being dissolved.

The total weight of acrylic resin (A) and cellulose ester resin (B) in the optical film of the present invention is preferably at least 55% by weight with respect the weight of the optical film, is more preferably at least 60% by weight, but is most preferably at least 70% by weight.

When resins other than acrylic resin (A) and cellulose ester resin (B) and additives are employed, it is preferable to regulate the added amount in the range in which functions of the optical film of the present invention are not adversely affected.

<Acrylic Particles (C)>

It is preferable that the optical film of the present invention incorporates acrylic particles.

Acrylic particles (C) according to the present invention refer to an acrylic component which exists in a particle state (hereinafter also referred to as a non-compatible state) in an optical film incorporating above acrylic resin (A) and cellulose ester resin (B) in a compatible state.

A specified amount of a prepared optical film is sampled, and the above optical film is dissolved in solvents. After complete dissolution/dispersion, filtration is carried out employing a membrane filter produced by PTFE having a pore diameter which is less than the average particle diameter of acrylic particles (C). It is preferable that any insoluble compounds which are collected via the above filtration are at least 90% by weight of acrylic particles (C) added to the optical film.

Acrylic particles (C) employed in the present invention are not particularly limited, but it is preferable that each of acrylic particles (C) is structured to have a layer configuration of at least two layers. Further, it is specifically preferable that each particle is an acrylic granular complex having the following multilayer structure.

"Multilayer structure acrylic granular complex", as described herein, refers to a granular acrylic polymer having a structure in which an elastic crosslinked soft layer polymer and an outermost hard layer polymer are stacked in layers.

Namely, "multilayer structure acrylic granular complex", as described herein, refers to a multilayer structure acrylic granular complex in which, toward the periphery from the center, an innermost hard layer, a crosslinked soft layer, and the outermost hard layer are arranged. The multilayer structure acrylic granular complex having the above three-layer core/shell structure is preferably employed.

As a preferred embodiment of the multilayer structure acrylic granular complex employed in the acrylic resin composition according to the present invention, listed is the one described below: an acrylic granular complex which incorporates a 3-layer structure composed of (a) an innermost hard layer polymer which is prepared by polymerizing a monomer mixture of 80-98.9% by weight of methyl methacrylate, 1-20% by weight of alkyl acrylate in which the number of carbon atoms of the alkyl group is 1-8, 0.01-5% by weight of polyfunctional crosslinking agents, and 0.01-0.3% by weight of polyfunctional grafting agents, (b) a crosslinked soft layer polymer which is prepared by polymerizing, in the presence of the above innermost hard layer polymer, a monomer mixture of 75-98.5% by weight of alkyl acrylate in which the number of carbon atoms of the alkyl group 4-8, 0.01-5% by weight of polyfunctional crosslinking argents, and 0.5-5% by weight of functional grafting agents, and (c) an outermost hard layer polymer which is prepared by polymerizing, in the presence of the polymer composed of the above innermost hard layer and crosslinked soft layer, a monomer mixture of 80-99% by weight of methyl methacrylate, 1-20% by weight of alkyl acrylate in which the number of carbon atoms of the alkyl group of 1-8, and the resulting 3-layer structure polymer is composed of 5-40% by weight of innermost hard layer polymer (a), 30-60% by weight of soft layer polymer (b), and 20-50% by weight of outermost hard layer polymer (c), and when being subjected to fraction via acetone, an insoluble portion exists and the methyl ethyl ketone swelling degree of the above insoluble portion is 1.5-4.0.

As disclosed in Japanese Patent Publications No. 60-17406 and 3-39095, not only by specifying the composition of each layer of the multilayer structure acrylic granular complex and the particle size, but also by setting the pulling elastic modulus of the multilayer structure acrylic granular complex and the methyl ethyl ketone swelling degree of the acetone-insoluble portion within the specified range, it is possible to realize a sufficient balance between the impact resistance and the stress resistance whitening properties.

It is preferable that innermost hard layer polymer (a), which constitutes the multilayer structure acrylic granular complex, is prepared by polymerizing a monomer mixture composed of 80-98.9% by weight of methyl methacrylate, 1-20% by weight of alkyl acrylate in which the number of carbon atoms of the alkyl group is 1-20, and 0.01-0.3% by weight of polyfunctional grafting agents.

Alkyl acrylates, in which the number of carbon atoms of the alkyl group is 1-8, include methyl acrylate, ethyl acrylate, n-propyl acrylate, n-butyl acrylate, s-butyl acrylate, and 2-ethylhexyl acrylate, and of these, preferably employed are methyl acrylate and n-butyl acrylate.

The ratio of alkyl acrylate units in innermost hard layer polymer (a) is commonly 1-20% by weight. When the aforesaid units are less than 1% by weight, the resulting polymer tends to thermally decompose, while when they exceeds 20% by weight, the glass transition temperature of innermost hard layer polymer (c) is lowered, whereby impact resistance providing effects of the 3-layer structure acrylic granular complex is degraded. Accordingly, neither case is preferred.

Polyfunctional grafting agents include polyfunctional monomers, having different polymerizable functional groups, such as acrylic acid, methacrylic acid, maleic acid, and alkyl esters of fumaric acid, and allyl methacrylates are preferably employed. Polyfunctional grafting agents are employed to chemically combine the innermost hard layer polymer and the soft layer polymer. The ratio when employed in the innermost hard layer polymerization is 0.01-0.3% by weight.

As crosslinked soft layer polymer (b) which constitutes an acrylic granular complex, preferred is one which is prepared by polymerizing, in the presence of above innermost hard layer polymer (a), a monomer mixture of 75-98.5% by weight of alkyl acrylate in which the number of carbon atoms of the alkyl group is 1-8, 0.01-5% by weight of polyfunctional crosslinking agents, and 0.5-5% by weight of polyfunctional grafting agents.

As an alkyl acrylate in which the number of carbon atoms of the alkyl group is 4-8, preferably employed are n-butyl acrylate and 2-ethylhexyl acrylate.

Further, together with these polymerizable monomers, it is possible to copolymerize other monofunctional monomers at 25% by weight or less which are copolymerizable.

Other monofunctional monomers which are copolymerizable include styrene and substituted styrene derivatives. With regard to the ratio of alkyl acrylates in which the number of carbon atoms of the alkyl group is 4-8 to styrene, as the former ratio increases, the glass transition temperature of polymer (b) is lowered, whereby softness is achievable.

On the other hand, in view of transparency of resin compositions, it is advantageous to approach the refractive index of soft layer polymer (b) at normal temperature to that of innermost hard layer polymer (a), outermost hard layer polymer (c), and thermally plastic hard acryl resins. Upon considering the above, the ratio of both is chosen.

As a polyfunctional grafting agent, employed may be ones cited in the item of above innermost layer hard polymer (a). Polyfunctional grafting agents employed herein are employed to chemically combine soft layer polymer (b) and outermost hard layer polymer (c), and in view of providing of targeted impact resistance effects, the ratio employed during the innermost hard layer polymerization is preferably 0.5-5% by weight.

As an employable polyfunctional crosslinking agent may be commonly known crosslinking agents such as divinyl compounds, diallyl compounds, or dimethacryl compounds. Of these, preferably employed are polyethylene glycol diacrylates (at a molecular weight of 200-600).

Polyfunctional crosslinking agents, employed herein, are employed to realize effects of impact resistance via formation of a crosslinking structure during polymerization of soft layer (b). However, when the above polyfunctional grafting agents are employed during polymerization of the soft layer, the crosslinking structure in soft layer (b) is formed to some extent. Accordingly, polyfunctional crosslinking agents are not essential components. In view of targeted effects to provide impact resistance, the ratio of polyfunctional crosslinking agents during soft layer polymerization is preferably 0.01-5% by weight.

As outermost hard layer polymer (c) which constitutes a multilayer structure acrylic granular complex, preferred is one which is prepared, in the presence of the above innermost hard layer polymer (a) and soft layer polymer (b), by polymerizing a monomer mixture composed of 80-99% by weight of methyl methacrylate and 1-20% by weight of alkyl acrylate in which the number of carbon atoms in the alkyl group is 1-8.

As alkyl acrylates, employed are those described above, and of these, preferably employed are methyl acrylate and ethyl acrylate. The ratio of alkyl acrylate units in uppermost hard layer (c) is preferably 1-20% by weight.

Further, to enhance compatibility with acrylic resin (A) during polymerization of outermost hard layer (c), it is possible to employ mercaptan as a chain transfer agent to regulate the resulting molecular weight.

In particular, to improve the balance between elongation and impact resistance, it is preferable to result in a gradient so that the molecular weight gradually decreases from the interior to the exterior. A specific method is as follows. A monomer mixture to form the outermost hard layer is divided into at least two parts. By a technique in which chain transfer agents, which are added each time, are gradually increased, it is possible to decrease the molecular weight of polymers to form the outermost hard layer from the interior of the multilayer structure acrylic granular complex to the exterior.

It is possible to check the molecular weight during the above formation as follows. The monomer mixture employed each time is individually polymerized under the same conditions, and the molecular weight of the resulting polymer is determined.

The diameter of acrylic particles (C) preferably employed in the present invention is not particularly limited. The above diameter is preferably 10-1,000 nm, is more preferably 20-500 nm, but is most preferably 50-400 nm.

In the acrylic granular complex, which is the multilayer structure polymer preferably employed in the present invention, the weight ratio of the core and the shell is not particularly limited. When the entire multilayer structure polymer is assigned at 100 parts by weight, the core layer occupies preferably 50-90 parts by weight, but occupies more preferably 60-80 parts by weight. Incidentally, the core layer, as described herein, refers to the innermost hard layer.

Examples of commercial products of the above multilayer structure acrylic granular complex include "METABLEN" produced by Mitsubishi Rayon Co., Ltd., "KANEACE" produced by Kaneka Corp. "PARALOID" produced by Kureha Chemical Industry Co., Ltd., "ACRYLOID" produced by Rohm and Haas Co., "STAFILOID" produced by Ganz Chemical Industry Co., and "PARAPET SA" produced by Kuraray Co., Ltd. These products may be employed individually or in combinations of at least two.

Further, specific examples of acrylic particles (c-1), which are composed of graft copolymers, appropriately employed as acrylic particles (C) preferably employed in the present invention, include graft polymers which are prepared by copolymerizing, in the presence of rubber polymers, a mixture of monomers composed of unsaturated carboxylic acid ester based monomers, unsaturated carboxylic acid based monomers, and aromatic vinyl based monomers, as well as if desired, other vinyl based monomers which are copolymerizable with the above.

Rubber polymers employed in acrylic particles (c-1), which are graft copolymers, are not particularly limited, and diene based rubber, acryl based rubber, and ethylene based rubber are employable. Specific examples thereof include polybutadiene, styrene-butadiene copolymers, styrene-butadiene block copolymers, acrylonitrile-butadiene copolymers, butyl acrylate-butadiene copolymers, polyisoprene, butadiene-methyl methacrylate copolymers, butyl acrylate-methyl methacrylate copolymers, butadiene-ethyl acrylate copolymers, ethylene-propylene copolymers, ethylene-propylene-diene based copolymers, ethylene-isoprene copolymers, and ethylene-methyl acrylate copolymers. These rubber polymers may be employed individually or in combinations of at least two types.

Further, when acrylic particles (C), are added to the optical film of the present invention, in view of preparation of a highly transparent film, it is preferable that the refractive index of the mixture of acrylic resin (A) and cellulose ester resin (B) is near that of acrylic particles (C). Specifically, any difference in the refractive index between acrylic particles (C) and acrylic resin (A) is preferably at most 0.05, is more preferably at most 0.02, but is most preferably at most 0.01.

In order to satisfy the above refractive index conditions, it is possible to decrease the difference in refractive index by employing a method in which each monomer unit composition ratio is regulated, and/or a method in which the composition ratio of employed rubber polymers or monomers is regulated, whereby it is possible to prepare an optical film which excels in transparency.

"Difference in refractive index", as described herein, refers to the following. The optical film of the present invention is sufficiently dissolved in acrylic resin (A) dissolvable solvents under optimal conditions to prepare a milky-white solution. The resulting solution is separated into a solvent soluble portion and a solvent insoluble portion via an operation such as centrifugal separation. Subsequently, each of the soluble portion (acrylic resin (A)) and the insoluble portion (acrylic particles (C)) is purified. Thereafter, each refractive index is determined (at 23° C. and 550 nm wavelength), whereby the difference is obtained.

Methods to blend acrylic resin (A) with acrylic particles (C) in the present invention are not particularly limited. A method is preferably employed in which after blending acrylic resin (A) with other optional components, the resulting blend is homogeneously melt-kneaded via a uniaxial or biaxial extruder while adding acrylic particles (C).

Further, it is possible to employ a method in which a solution, into which acrylic particles (c) have been dispersed, is mixed with a solution (being a dope solution) which is prepared by dissolving acrylic resin (A) and cellulose ester resin (B) in solvents, and a method in which a solution which is prepared by dissolving acrylic particles (C) and other optional additives in solvents is added in-line.

It is possible to employ, as the acrylic particles according to the present invention, commercial products. Examples thereof may include METABLEN W-341 (C2) (produced by Mitsubishi Rayon Co., Ltd.) and CHEMISNOW MR-2G (C3) and MS-300X (C4) (produced by Soken Chemical & Engineering Co., Ltd.).

The optical film of the present invention incorporates acrylic particles (C), preferably in the amount range of 0.5-30% by weight with respect to the total weight of resins constituting the above film, but more preferably in the amount range of 1.0-15% by weight.

<Other Additives>

In the optical film of the present invention, in order to enhance fluidity and flexibility of the composition, it is possible to simultaneously employ plasticizers. Plasticizers may be phthalic acid based, aliphatic acid ester based, trimellitic acid ester based, phosphoric acid ester base, polyester based, or epoxy based.

Of these, polyester based and phthalic acid based plasticizers are preferably employed. The polyester based plasticizers excel in non-mobility and extraction resistance, compared to phthalic acid ester based plasticizers such as dioctyl phthalate, but are slightly inferior in plasticizing effects and compatibility.

Consequently, by selecting or simultaneously employing these plasticizers depending on intended use, they may fill a wide range of applications.

Polyester based plasticizers are reactants of uni- to tetravalent carboxylic acid with uni- to hexahydric alcohol, and those, which are prepared by allowing divalent carboxylic acid to react with glycol, are mainly employed. Representative divalent carboxylic acids include glutaric acid, itaconic acid, adipic acid, phthalic acid, azelaic acid, and sebacic acid.

Particularly, the use of adipic acid and phthalic acid enables preparation of those which excel in plasticizing characteristics. Glycols include ethylene, propylene, 1,3-butyrene, 1,4-butyrene, and dipropylene. These divalent carboxylic acids and glycols may be employed individually or in combinations.

The above ester based plasticizers may be any of the oligoester or polyester type. The molecular weight is preferably in the range of 100-10,000, but is more preferably in the range of 600-3,000, at which range plasticizing effects are more enhanced.

Further, viscosity of plasticizers correlates with their molecular structure and weight. In the case of adipic acid based plasticizers, the viscosity is preferably in the range of 200-5,000 MP·s (at 25° C.) from the relation with plasticization efficiency. Further, several polyester based plasticizers may be simultaneously employed.

It is preferable that 0.5-30 parts by weight of plasticizers are added to 100 parts by weight of the optical film of the present invention. However, it is not preferable that in practice, the added amount of the plasticizers exceeds 30 parts by weight, since the surface becomes sticky.

It is preferable that the optical film of the present invention incorporates UV absorbers. Employed UV absorbers include those which are benzotriazole based, 2-hydoxybenzophenone based, and salicylic acid phenyl ester based. For example, cited may be triazoles such as 2-(5-methyl-2-hydroxyphenyl)benzotriazole, 2-[2-hydroxy-3,5-bis(α,α-dimethylbenzyl)phenyl]-2H-benzotriazole, or 2-(3,5-di-t-butyl-2-hydroxyphenyl)benzotriazole, as well as benzophenones such as 2-hydroxy-4-methoxybenzophenone, 2-hydroxy-4-octoxybenzophenone, or 2,2'-dihydroxy-4-methoxybenzophenone.

Of UV absorbers, those having a molecular weight of at least 400 exhibit a high boiling point and are neither easily volatized nor scattered during molding at high temperature. Consequently, it is possible to effectively improve weather resistance via their addition of a relatively small amount.

UV absorbers having a molecular weight of at least 400 include benzotriazole based ones such as 2-[2-hydroxy-3,5-bis(α,α-dimethylbenzyl)phenyl]-2-benzotriazole, or 2,2-methylenebis[4-(1,1,3,3-tetrabutyl)-6-(2H-benzotriazole-2-yl)phenol; hindered amine based ones such as bis(2,2,6,6tetramethyl-4-piperidyl)sebacate or bis(1,2,2,6,6-pentamethyl-4-piperidyl)sebacate; further hybrid based ones having hindered phenol and hindered amine structures in the molecule such as 2-(3,5-di-t-butyl-4-hydroxybenzyl)-2-n-butylmalonic acid bis(1,2,2,6,6-pentamethyl-4-piperidyl) or 1-[2-[3-(3,5-di-t-butyl-4-hydroxyphenyl)propionyloxy]2,2, 6,6-tetramethylpyperidine. These may be employed individually or in combinations of at least two types. Of these, particularly preferred are 2-[2-hydroxy-3,5-bis(α,α-dimethylbenzyl)phenyl]-2-benzotriazole and 2,2-methylenebis[4-(1,1,3,3-tetrabutyl)-6-(2H-benzotriazole-2-yl)phenol.

Further, in order to minimize thermal decomposition and thermal staining during molding, it is possible to add various antioxidants to the optical film of the present invention. Still further, by the addition of antistatic agents, it is possible to provide the optical film with antistatic capability.

In the optical film of the present invention, fire resistant acrylic resin compositions blended with phosphor based fire retardants may be employed.

As phosphor based fire retardants employed here, listed may be mixtures incorporating at least one selected from red phosphorous, triaryl phosphoric acid esters, diaryl phosphoric acid esters, monoaryl phosphoric acid esters, aryl phosphoric acid compounds, aryl phosphine oxide compounds, condensed aryl phosphoric acid esters, halogenated alkyl phosphoric acid esters, halogen-containing condensed phosphoric acid esters, halogen-containing condensed phosphoric acid esters, and halogen containing phosphorous acid esters.

Specific examples thereof include triphenyl phosphate, 9,10-dihydro-9-oxa-10-phosphaphenantholene-10-oxide, phenylphosphonic acid, tris(β-chloroethyl)phosphate, tris (dichloropropyl)phosphate, and tris(tribromoneopentyl) phosphate.

The optical film of the present invention enables simultaneous realization of low hygroscopicity, high transparency, high heat resistance, and lowered brittleness which have not been realized by conventional resins films.

In the present invention, brittleness is evaluated based on criteria in which "an optical film results in no ductile breaking". By employing optical films which result in no ductile breaking and exhibit lowered brittleness, it is possible to produce polarizing plates for large liquid crystal display devices, which result in neither breakage nor cracking, are easily handled during their production. "Ductile breaking", as described herein, refers to breaking caused by applying stress which is greater than the strength of a material, and is defined as breaking of the material accompanied with marked elongation and twisting until the eventual breaking. The resulting fractured surface is characterized in that countless dents, called dimples, are formed.

In the present invention, "a film which results in no ductile breaking" is judged in such a manner that no breaking results by applying large stress to the film which allows the film to fold back on itself. When an optical film results in no ductile breaking under application of large stress as above, during its use as a polarizing plate protective film of large-sized liquid crystal display devices, it is possible to sufficiently decrease problems such as breaking during production. Further, when after adhesion, an optical film is peeled off and used again, no breaking occurs, and is able to correspond to the decrease in thickness of the optical film.

In the present invention, a tension softening point is employed as an index of heat resistance. Liquid crystal display devices have continually increased in size, as well as the luminance of backlight sources. In addition, still higher luminance is demanded for outdoor use such as digital signage. Consequently, it is demanded that such optical film is durable in a higher temperature. When the tension softening point is 105-145° C., it is judged that the film exhibits sufficient heat resistance, and it is specifically preferable to control it between 110 and 130° C.

The specific method to determine the temperature which exhibits the tension softening point of optical films is as follows. For example, by employing a TENSIRON tester (RTC-1225A, produced by Orientec Co., Ltd.), the tested optical film is cut into 120 mm (longitudinal)×10 mm (wide). The resulting film is tensioned at 10 N while elevating the temperature at a rate of 30° C. per minute. At the time to reach 9 N, temperature is determined thrice and the tension softening point is obtained by averaging the resulting values.

Further, in view of heat resistance, glass transition temperature (Tg) of optical films is preferably at least 110° C., is more preferably at least 120° C., but is most preferably at least 150° C.

"Glass transition temperature", as described herein, refers to the midpoint glass transition temperature Tmg) determined in accordance with JIS K 7121 (1987) in which measurements are carried out at a temperature elevating rate of 20°

C./minute employing a differential scanning calorimeter (DSC-Type 7, produced by Perkin Elmer Co.).

As an index to evaluate the transparency of the optical film of the present invention, employed are haze values (being turbidity). Specifically, since liquid crystal display devices employed outdoor are required to exhibit sufficient luminance and high contract in bright places, the haze value is required to be at most 1.0%, but is preferably at most 0.5%.

The optical film of the present invention, which incorporates acrylic resin (A) and cellulose ester resin (B), enables realization of high transparency. When acrylic particles are employed to improve other physical properties, it is possible to minimize an increase in the haze value by decreasing the difference in refractive index between resin (acrylic resin (A) and cellulose ester resin (B)) and acrylic resin (C).

Further, since surface roughness also affects the haze value as a surface haze, it is effective that the diameter and added amount of acrylic particles (C) are regulated within the above range and the surface roughness of a film contacting portion during film making is kept low.

Further, hygroscopicity of the optical film of the present invention is evaluated via dimensional changes with respect to humidity changes.

The following method is employed as an evaluation method of dimensional changes with respect to humidity changes.

In the casting direction of a prepared optical film, a mark (being a+mark) was placed in two positions. The marked film is allowed to stand at 90° C. and 90% relative humidity for 1,000 hours. The distance between the marks prior to and after the treatment is determined via an optical microscope, and dimensional variation ratio (in %) is obtained. Dimensional variation ratio (in %) is represented by the following formula.

Dimensional variation ratio (in %)={$(a1-a2)/a1$}×100 a1: distance prior to thermal treatment
a2: distance after thermal treatment

When an optical film is employed as a polarizing plate protective film of liquid crystal display devices, non-uniformity and variation of retardation values result due to the dimensional variation via moisture absorption, whereby problems such as a decrease in contrast and color shading occur. The above problems are specifically marked in the polarizing plate protective film employed in liquid crystal display devices employed outdoors. However, when the dimensional variation ratio is less than 0.5% under the above conditions, it is possible to evaluate the optical film as one which exhibits sufficiently low hygroscopicity. Further, the above dimensional variation ratio is preferably less than 0.3%.

Further, the number of defects at a diameter of at least 5 μm on the surface of the optical film of the present invention is preferably 0.5/10-cm-square, but is more preferably 0.1/10-cm-square.

"Diameter of the defect", as described herein, refers to the diameter when the defect is circular. When the defect is not circular, the area of the defect is determined via the following method while observed via a microscope, and the resulting maximum diameter (being a diameter of the inscribed circle) is taken.

The area of the defect, when it is an air bubble or foreign matter, is the size of the shadow when the defect is observed via a differential interference microscope. When the defect is a surface state change such as transfer of roller flaws or abrasion, the size is determined via observation employing the deferential interference microscope.

In the case of observation via reflected light, when the area of a defect is not clear, aluminum or platinum is vapor-deposited onto the surface, followed by further observation.

In order to manufacture high quality films with the least frequency of the above defects under desired productivity, it is effective that a polymer solution is precisely filtered prior to extrusion, the degree of cleanness around an extruder is enhanced, and drying conditions after extrusion are set stepwise so that drying is efficiently carried out while minimizing foam formation.

When the number of defects is at least $\frac{1}{10}$-cm-square, productivity is occasionally degraded in such a manner that in the course of treatment during a post-process, when tension is applied to the film, the film breaks at the position of defects. Further, when the diameter of defects is at least 5 μm, they may be visually detected via observation of polarizing plates, and when employed as an optical material, bright spots are occasionally formed.

Further, even in the case in which nothing is detected via visual observation, when a hard coat layer is formed on the aforesaid film, defects (non-coated spots) are occasionally formed in such a manner that it is impossible to achieve uniform formation of coating materials. Defects, as described herein, refer to voids (being foam defects) in the film, generated by abrupt evaporation of solvents during the drying process of solution film production, and foreign matter (foreign matter defects) in the film due to foreign matter in a primary film making solution or mixed foreign matter during film production.

Further, rupture elongation of the optical film of the present invention in at least one direction is preferably at least 10%, but is more preferably 20%, which is determined based on JIS K7127 1999.

The upper limit of rupture elongation is not particularly limited, and the practical limit is approximately 250%. In order to increase the rupture elongation factor, it is effective to retard the formation of defects in film due to foreign matter and foaming.

Thickness of the optical film of the present invention is preferably at least 20 μm, but is more preferably at least 30 μm.

The upper limit of the thickness is also not particularly limited. When a film is prepared via a solution film producing method, in view of coatability, foaming, and solvent drying, the upper limit is approximately 250 μm. Film thickness may appropriately be selected based on use.

Total light transmittance of the optical film of the present invention is preferably at least 90%, but is more preferably at least 93%. Further, the practical upper limit is approximately 99%. In order to achieve excellent transparency, represented by the above total light transmittance, it is effective that additives and copolymerizing components which absorb visible light are not allowed to be incorporated, and diffusion and absorption of light in the interior of the film is decreased by removing foreign matter in polymers via precise filtration.

Further, it is effective that roughness of the film surface is decreased by decreasing the surface roughness of film contacting portions (such as cooling rollers, calendering rollers, drums, belts, coating devices of a solution film production, or conveying rollers) during film production and diffusion and reflection of light on the film surface are decreased by reducing the refractive index of acrylic resins.

When the optical film of the present invention satisfies the above physical properties, it may preferably be employed as a polarizing plate protective film for outdoor liquid crystal display devices.

The above physical properties are realized by employing an optical film characterized in that acrylic resin (A) and cellulose ester resin (B) are incorporated at a weight ratio of 95:5-30:70, average molecular weight Mw of above acrylic resin (A) is at least 80,000, total substitution degree (T) of the acyl group of above cellulose ester resin (B) is 2.00-3.00, the substitution degree of the acyl group having 3-7 carbon atoms is 1.2-3.0, and weight average molecular weight (Mw) is 75,000.

<Optical Film Production>

Examples of the production method of an optical film will now be described, however the present invention is not limited thereto.

As an optical film production method, employed may be an inflation method, a T-die method, a calendering method, a cutting method, a casting method, an emulsion method, or a hot press method. In view of coloration retardation, reduction of foreign matter defects, and decrease in optical defects of the die line, preferred is solution film production employing a casting method.

(Organic Solvents)

When the optical film of the present invention is produced via the solution casting method, as useful organic solvents to form a dope, any solvent may be employed without limitation as long as it simultaneously dissolves acrylic resin (A), cellulose ester resin (B), and other additives.

Examples thereof may include, as chlorine based organic solvents, methylene chloride, and as non-chlorine based organic solvents, methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,-hexafluoro-2-methyl-2-propanol, 1,1,1,3,3,3-hexafluoro-2-propanol, 2,2,3,3,3-pentafluoro-1-propanol, and nitroethane. The methylene chloride, methyl acetate, ethyl acetate, and acetone are preferably employable.

It is preferable that other than the above organic solvents, incorporated in the dope, are aliphatic alcohols having a straight or branched chain having 1-4 carbon atoms in an amount of 1-40% by weight. As the alcohol ratio in the dope increases, the resulting web is gelled, whereby peeling from a metal support become easier. Further, as the ratio of alcohol is low, it enhances dissolution of acrylic resin (A) and cellulose ester resin (B) in non-chlorine based organic solvents.

Specifically, a dope composition is preferred which is prepared by dissolving, in solvents incorporating methylene chloride and aliphatic alcohols having a straight or branched chain having 1-4 carbon atoms, three of acrylic resin (A), cellulose ester resin (B), and acrylic particles (C) in an total amount of 15-45% by weight.

As aliphatic alcohols having a straight or branched chain having 1-4 carbon atoms, listed may be methanol ethanol, n-propanol, iso-propanol, n-butanol, sec-butanol, and tert-butanol.

The preferable film production method of the optical film of the present invention will now be described.

1) Dissolution Process

A dissolution process prepares a dope in such a manner that acrylic resin (A) and cellulose ester resin (B), and in some cases, acrylic particles (C) and other additives are dissolved, while stirring, in organic solvents mainly composed of good solvents for above acrylic resin (A) and cellulose ester resin (B) employing a dissolution kettle, or prepares a dope which is a major dissolution liquid by blending, in some cases, acrylic particles (C) and other additive solutions with above acrylic resin (A) and cellulose ester resin (B) solution.

It is possible to dissolve acrylic resin (A) and cellulose ester resin (B) via various dissolution methods such as: a method in which dissolution is carried out at normal pressure, a method in which dissolution is carried out at the temperature of at most the boiling point of the major solvent, a method employing any of the cooling dissolution methods described in JP-A Nos. 9-95544, 9-95557, and 9-95538, a method, described in JP-A No. 11-21379, in which dissolution is carried out under high pressure. Of these, preferred is the method in which dissolution is carried out at the temperature of at least the boiling point of the major solvent under pressure application.

The total concentration of acrylic resin (A) and cellulose ester resin (B) in a dope is preferably in the range of 15-45% by weight. Additives are added to the dope during or after dissolution. After dissolution or dispersion, the resulting mixture is filtered via a filter and defoamed, followed by transfer to the next process via a solution conveying pump.

It is preferable that filtration is carried out employing a filter at a particle catching diameter of 0.5-5 μm and a filtered water time of 10-25 seconds/100 ml.

In the above method, aggregates remained during particle dispersion and formed during the addition of the major dope, are only removable by employing a filter at a particle catching diameter of 0.5-5 μm and a filtered water time of 10-25 seconds/100 ml. In the major dope, since particle concentration is sufficiently low compared to that of the added solution, no abrupt increase in filtering pressure due to mutual adhesion of aggregates during filtration occurs.

FIG. 1 is a schematic view of one example of a dope preparation process, a casting process, and a drying process of the solution casting film producing method which is preferred in the present invention.

If needed, large aggregates are removed via filtering device 44 from the acrylic particle preparation kettle, followed by transfer to stock kettle 42. Thereafter, an acrylic particle adding solution is added to major dope dissolving kettle 1 from stock kettle 42.

Thereafter, the major dope solution is filtered via major filtering device 3, followed by the inline addition of UV absorbing agent adding solution 16.

In many cases, the major dope occasionally incorporates side materials in an amount of about 10-about 50% by weight. Occasionally, the side materials include acrylic particles. In such a case, it is preferable to control the added amount of the acrylic particle adding solution matching to that of the added amount of the side materials.

The content of acrylic particles in the acrylic particle-containing addition solution is preferably 0.5-10% by weight, is more preferably 1-10% by weight, but is most preferably 1-5% by weight.

The above addition range is preferred since the added solution is easily handled due to its low viscosity, and is easily added to the major dope.

"Side materials", as described herein, refer to ones which are produced by finely pulverizing optical films Available ones include trimmed portions of film of both edges formed during production of optical film and mill rolls which are not within the specifications, for example, due to the presence of abrasion defects.

Further, it is possible to preferably employ pellets which are prepared by kneading acrylic resins and cellulose ester resins, and possibly acrylic particles, followed by pellet formation.

2) Casting Process

A casting process is one in which dope is transferred to pressurized die 30 via a solution sending pump (for example, a pressurized type quantitative gear pump) and is cast from the pressurized die slit onto the casting position on continuously moving looped metal belt 31 such as a stainless steel belt, or a rotating metal drum.

A pressurized die is preferred in which the slit shape of the hole metal portion of the die can be regulated to easily make the film thickness uniform. Pressurized dies include a coat hanger die and a T die, and any of these are preferably employed. The surface of metal supports is finished to be specular. In order to increase the film production rate, a multilayer may be realized in such a manner that at least two pressurized dies are provided on the metal support and the dope is divided into several portions. Alternately, it is also preferable to prepare a laminated structure film via a co-casting method in which a plurality of divided dope portions is simultaneously cast.

3) Solvent Evaporating Process

A solvent evaporating process is one in which a web (namely, a dope is cast onto a casting support and the resulting dope film is called a web) is heated on the casting support, whereby solvents evaporate.

Solvents are evaporated via a method in which air is blown from the web side and/or a method in which heat is transmitted via a liquid from the reverse side, and a method in which heat is transmitted via radiant heat from both the front and reverse surfaces. Of these, the reverse surface liquid heat transmission method is preferred since higher drying efficiency is realized. Further, preferably employed are combinations of these methods. It is preferable that the web, on the support after casting, is dried on the support under an ambience of 40-100° C. In order to maintain the ambience of 40-100° C., it is preferable that airflow at the above temperature impinges the upper surface of the web, or heating is carried out via means such as infrared rays.

In view of surface quality, hygroscopicity, and peeling properties, the above web is peeled from the web within 30-120 seconds.

4) Peeling Process

A peeling process is one in which a web, from which solvents have been evaporated on the metal support, is peeled in a predetermined peeling position. The peeled web is conveyed to the following process.

Temperature in the peeling position on the metal support is preferably 10-40° C., but is more preferably 11-30° C.

The residual solvent amount while peeled in the web on the metal support is preferably in the range of 50-120% by weight in view of drying conditions and the length of the metal support. When peeled in the presence of a relatively large amount of residual solvents, the web is excessively soft, whereby flatness is deteriorated to tend to form wrinkles and longitudinal streaks caused by peeling tension. Consequently, the amount of residual solvents in the peeling position is determined via compatibility between an economical rate and quality.

The residual solvent amount in a web is defined by the following formula.

Residual solvent amount (%)=(weight of a web prior to a heat treatment−weight of the web after the heat treatment)×100

Heat treatment during determination of the residual solvent amount refers to one carried out at 115° C. for one hour.

Peeling tension during peeling of film from the metal support is commonly 196-245 N/m. However, when wrinkles tend to result, it is preferable that peeling is carried out under a tension of at most 190 N/m. Further, during peeling, the lowest peeling tension is preferably at most 166.6 N, is more preferably at most 137.2 N/m, but is most preferably at most 100 N/m.

In the present invention, temperature in the peeling position on the above metal support is preferably regulated to −50-40° C., more preferably to 10-40° C., but most preferably to 15-30° C.

5) Drying and Stretching Processes

After peeling, the web is dried employing dryer 35 in which the web is alternately passed through a plurality of rollers installed in the web dryer and/or tenter stretching apparatus 34 which conveys a web while clipping both edges of the web.

In common drying means, heated air is blown onto both sides of the web. Means are also available in which heating is carried out via application of microwaves instead of air flow. Excessively rapid drying tends to deteriorate flatness of the finished film. High temperature drying is preferably carried out when the residual solvents reaches 8% by weight. Throughout the entire process, drying is carried out between about 40 to about 250° C., but is preferably carried out specifically between 40 to 160° C.

When a tenter stretching apparatus is employed, it is preferable to employ an apparatus which enables independent control of the film holding length (the distance from the holding initiation to the holding termination) at the right and the left. Further, during the tentering process, to improve flatness, it is preferable to intentionally provide zones which differ in temperature.

Further, it is also preferable to provide a neutral zone between temperature different zones so that adjacent zones result in no interference.

Stretching operation may be carried out in dividing into multiple stages. It is preferable to carry out biaxial stretching in the casting direction as well as in the lateral direction. Further, when biaxial stretching is carried out, simultaneous biaxial stretching may be employed, or it may be stepped stretching.

In the above case, "stepped" refers, for example, to a process in which it is possible to carry out sequential stretching which differs in stretching direction or in which it is possible to divide stepped stretching in the same direction and to add stretching in another direction in any of the steps. Namely, it is possible to employ, for example, the following stretching steps.

Stretching in the casting direction-stretching in the lateral direction-stretching in the casting direction-stretching in the casting direction Stretching in the lateral direction-stretching in the lateral direction-stretching in the casting direction-stretching in the casting direction Further, simultaneous biaxial stretching includes a case in which stretching is carried out in one direction and tension in another direction is relaxed to allow contraction. Stretching ratio of simultaneous biaxial stretching is preferably in the range of a factor of 1.01-1.5 in the lateral and longitudinal directions.

When tentering is carried out, the residual solvent amount in a web is preferably 20-100% by weight at the initiation of tentering. It is preferable that until the residual solvents in the web reaches at most 10% by weight, drying is carried out while tentering. The above residual solvents in the web is more preferably at most 5 by weight.

Drying temperature during tentering is preferably 30-160° C., is more preferably 50-150° C., but is most preferably 70-140° C.

During the tentering process, in view of enhancement of film uniformity, it is preferable that temperature distribution in the lateral direction under any ambience is small. The temperature distribution in the lateral direction during the tentering process is preferably ±5° C., is more preferably ±2° C., but is most preferably ±1° C.

6) Winding Process

A winding process is one in which, after the residual solvent amount in the web reaches at most 2% by weight, as an optical film, the resulting web is wound by winder 37. By realizing the residual solvent amount to be 0.4% by weight, it is possible to prepare a film which exhibits excellent dimensional stability. It is particularly preferable that winding is carried out at a residual solvent amount of 0.00-0.10% by weight.

Commonly employed methods may be employed as a winding method, and include a constant torque method, a constant tension method, a tapered tension method, and an internal stress constant program tension control method. Any of these may be appropriately selected and employed.

The optical film of the present invention is preferably a long-roll film In practices its length is about 100-about 5,000 m, and it is provided in a roll shape. Further, the film width is preferably 1.3-4 m, but is more preferably 1.4-2 m.

Thickness of the optical film of the present invention is not particularly limited. When it is employed as the polarizing plate protective film, described below, the thickness is preferably 20-200 μm, is more preferably 25-100 μm, but is most preferably 30-80 μm.

(Polarizing Plate)

When the optical film of the present invention is employed as a polarizing plate protective film, it is possible to prepare the polarizing plate employing any common method. It is preferable that an adhesive layer is provided on the reverse side of the optical film of the present invention and the resulting optical film is adhered to at least one of the sides of a polarizer which is produced by immersion into an iodine solution, and then stretched.

On the other side, employed may be the optical film of the present invention or another polarizing plate protective film. For example, preferably employed are commercial cellulose ester films (such as KONICA MINOLTA TAC KC8UX, KC4UX, KC5UX, KC8UY, KC4UY, KC12UR, KC8UCR-3, KC8UCR-4, KC8UCR-5, KC8UE, KC4UE, KC4FR-3, KC4FR-4, KC4HR-1, KC8UY-HA, and KC8UX-RHA, all produced by Konica Minolta Opto, Inc.).

A polarizer, which is a major constitutional component of the polarizing plate, is an element which transmits light in a polarized wave plane in a specific direction. The representative polarizing film, which is presently known, is a polyvinyl alcohol based polarizing film, which includes one dyed with iodine and the other which is dyed with dichroic dyes.

The employed polarizer is prepared as follows. A film is prepared employing an aqueous polyvinyl alcohol solution. The resulting film is uniaxially stretched, followed by dying, or after dying, it is uniaxially stretched, followed by an endurance enhancing treatment, by preferably employing boron compounds.

It is preferable to employ adhesive agents used in the above adhesive layer so that at least one portion of the adhesive layer exhibits a storage elastic modulus in the range of $1.0 \times 10^4$-$1.0 \times 10^9$ Pa at 25° C. Curing type adhesive agents are appropriately employed, which form high molecular weight compounds, or crosslinking structures via various chemical reactions after coating the above adhesives, followed by adhesion.

Specific examples thereof include such as urethane based adhesive agents, epoxy based adhesive agents, aqueous polymer-isocyanate based adhesive agents, curing type adhesive agents such as a thermally cured type acrylic adhesive agent, moisture cured urethane adhesive agents, anaerbiotic adhesive agents such as polyether methacrylate types, ester based methacrylate types, or oxidation type polyether methacrylates, cyanoacrylate based "instant" adhesive agents, and acrylate and peroxide based dual liquid type "instant" adhesive agents.

The above adhesive agents may be either of a single liquid type, or of a type such that prior to use, at least two liquids are blended.

Further, the above adhesive agents may he of a solvent based type in which organic solvents are employed as a medium, of an aqueous type such as an emulsion type, a colloid dispersion type, or an aqueous solution type in which media are composed of water as a major component, or may be of a non-solvent type. Concentration of the above adhesive agent solution may be appropriately determined depending on the film thickness after adhesion, the coating method, and the coating conditions, and is commonly 0.1-50% by weight.

(Liquid Crystal Display Device)

By incorporating a polarizing plate, adhered together with the optical film of the present invention, in a liquid crystal display device, it is possible to produce a liquid crystal display device which excels in various kinds of visibility. The above polarizing plate is preferably employed specifically in large liquid crystal display devices, as well as outdoor liquid crystal display devices such as digital signage. The polarizing plate according to the present invention is adhered to liquid crystal cells via the above adhesive layer.

The polarizing plate according to the present invention is preferably employed in a reflection type, transparent type, or semi-transparent type LCD, or in various driving system LCDs such as a TN type, an STN type, an OCB type, an HAN type, a VA type (a PVA type and an MVA type), and an IPS type (including an FFS system). Specifically in a large screen display device, particularly a screen of at least 30 type, especially of 30-54 type, no white spots occur at the periphery of the screen and its effect is maintained over an extended duration.

Further, effects are realized in which color shade, glare, and wavy mottling are minimized, and eyes do not tire even when viewing over an extended duration.

EXAMPLES

The present invention will now be specifically described with reference to examples, however the present invention is not limited thereto.

Example 1

Preparation of Acrylic Resins

Following Acrylic Resins A1-A7, and MS1 and MS2 were prepared via methods known in the art.

A1: monomer weight ratio (MMA:MA=98:2), Mw 70,000

A2: monomer weight ratio (MMA:MA=97:3), Mw 160,000

A3: monomer weight ratio (MMA:MA=97:3), Mw 350,000

A4: monomer weight ratio (MMA:MA=97:3), Mw 550,000

A5: monomer weight ratio (MMA:MA=97:3), MW 800,000

A6: monomer weight ratio (MMA:MA=97:3), Mw 930,000

A7: monomer weight ratio (MMA:MA=94:6), Mw 1,100,000

MS1: monomer weight ratio (MMA:ST=60:40), Mw 100,000

MS2: monomer weight ratio (MMA:ST=40:60), Mw 100,000

MMA: methyl methacrylate

MA: methyl acrylate

ST: styrene (Synthesis of A8)

Initially, a methyl methacrylate/acrylamide copolymer suspending agent was prepared as follows.

| Methyl methacrylate | 20 parts by weight |
|---|---|
| Acrylamide | 80 parts by weight |
| Potassium persulfate | 0.3 part by weight |
| Ion-exchanged water | 1500 parts by weight |

The above compounds were placed in a reaction vessel, and while replacing the ambient atmosphere in the above reaction vessel with nitrogen gas, reaction progressed until monomers were completely modified to become polymers at 70° C. The resulting aqueous solution was employed as a suspending agent. A solution prepared by dissolving 0.05 part of the above suspending agent in 165 parts by weight of ion-exchanged water was fed into a stainless steel autoclave fitted with baffles and Faudler type stirring blades, and was stirred at 400 rpm while replacing the system interior with nitrogen gas.

Secondly, a mixture composed of the following composition was added while stirring the reacting system.

| Methacrylic acid | 27 parts by weight |
|---|---|
| Methyl methacrylate | 73 parts by weight |
| t-Dodecylmercaptan | 1.2 parts by weight |
| 2,2'-azobisisobutyronitrile | 0.4 part by weight |

After addition, temperature was raised to 70° C. When the interior temperature reached 70° C., polymerization was initiated, followed by polymerization for 180 minutes while maintaining the temperature.

Thereafter, based on conventional methods, the reaction system was cooled, and after separating the resulting polymer, washing and drying were carried out, whereby a bead-shaped copolymer was prepared. The polymerization ratio of the resulting polymer was 97%, while the weight average molecular weight was 130,000.

The resulting copolymer was blended with 0.2% by weight of an additive (NaOCH$_3$). By employing a biaxial extruder (TEX30 (L/D of 44.5, produced by Japan Steel Works, Ltd.), while purging 10 L/minute of nitrogen from the hopper section, an intramolecular ring-forming reaction was carried out at a cylinder temperature of 290° C. under a screw rotation rate of 100 rpm, and a low material supplying rate of 5 kg/hour, whereby pellets were prepared, followed by vacuum drying at 80° C. for 8 hours. Thus, Acrylic Resin A8 was prepared Weight average molecular weight (Mw) and Tg of Acrylic Resin A8 were 130,000 and 140° C., respectively.

The acrylic resin, described in Example 1 of Patent Document 3 (JP-A No. 2005-146084), was prepared via the same method described in (0068)-(0070) of Patent Document 3 and employed as 1A of Patent Document 3. The weight average molecular weight of Acrylic Resin 1A of Patent Document 3 was 244,000.

Polymer 1, described in Example of Patent Document 5 (JP-A No. 2003-12859) was prepared via the same method as that described in paragraph (0087) of Patent Document 5, and was employed as Polymer 1 of Patent Document 5. The weight average molecular weight of Polymer 1 of Patent Document 5 was 5,000.

Other than the above, employed were the following commercial acrylic resins.

DIANAL BR80 (produced by Mitsubishi Rayon Co., Ltd.) at Mw of 95,000

DIANAL BR83 (produced by Mitsubishi Rayon Co., Ltd.) at Mw of 40,000

DIANAL BR85 (produced by Mitsubishi Rayon Co., Ltd.) at Mw of 280,000

DIANAL BR88 (produced by Mitsubishi Rayon Co., Ltd.) at Mw of 480,000

80N (produced by Asahi Chemicals Co. Ltd.) at Mw of 100,000

Any of the ratios of MMA units in molecules of the above commercial acrylic resins were 90-99% by weight.

(Preparation of Optical Films)

<Preparation of Optical Film 1>

| (Dope Liquid Composition 1) | |
|---|---|
| DIANAL BR85 (produced by Mitsubishi Rayon Co., Ltd.) | 70 parts by weight |
| Cellulose ester (cellulose acetate propionate at a total substitution degree of an acyl group of 2.7, a substitution degree of an acetyl group of 0.19, a substitution degree of a propionyl group of 2.56, and Mw of 200,000 | 30 parts by weight |
| Methylene chloride | 300 parts by weight |
| Ethanol | 40 parts by weight |

The above composition was subjected to complete dissolution under heating, whereby a dope liquid was prepared.

(Preparation of Acrylic Resin Film)

The dope liquid, prepared as above, was uniformly cast onto a 2 m wide stainless steel band support at 22° C., employing a belt casting apparatus. Solvents were evaporated on the stainless steel band support so that the residual solvent amount reached 100%, and the resulting film was peeled from the stainless steel band via a peeling tension of 162 N/m.

The peeled acrylic resin web was heated at 35° C. to evaporate solvents and was slit to a 1.6 m width. Thereafter, while being stretched by a factor of 1.1 in the lateral direction via a tenter, drying was carried out carried out at a drying temperature of 135° C. When stretching was initiated via the tenter, the amount of residual solvents was 10%.

After tenter stretching, relaxation was allowed out for 5 minutes at 130° C. Thereafter, drying was completed via conveyance into 120° C. and 140° C. drying zones employing numerous rollers, and slitting was carried out for a 1.5 m width. Subsequently, a knurling treatment of a width of 10 mm and a height of 5 μm was applied to both edges, followed by winding onto a core of an internal diameter of 15.24 cm under an initial tension of 220 N/m and a final tension of 110 N/m, whereby Optical Film 1, which was an acrylic resin film, was prepared.

The stretching magnitude in the MD direction, calculated based on the rotation rate of the stainless steel band support and the driving rate of the tenter, was at a factor of 1.1.

The residual solvent amount, film thickness and roll length of Optical Film 1, described in Table 1, were 0.1%, 60 μm, and 4,000 m, respectively <Preparation of Optical Films 2-50>

Optical Films 2-50 were prepared in the same manner as above Optical Film 1, except that types and composition ratios of acrylic resin (A) and cellulose ester resin (B) were changed as listed in Tables 1 and 2.

Further, with regard to the acyl group of cellulose ester resins listed in Tables 1 and 2, "ac" represents an acetyl group, "pr" represents a propionyl group, "bu" represents a butylyl group, "pen" represents a pentanoyl group, "bz" represents a benzoyl group, "hep" represents a heptanoyl group, "oct" represents an octanoyl group, and "ph" represents a phthalyl group.

<Preparation of Optical Film 51>

Optical Film 51 was prepared in the same manner as above Optical Film 1, except that the dope composition was changed as described below.

(Dope Composition Liquid 51)

| | |
|---|---|
| DIANAL BR85 (produced by Mitsubishi Rayon Co., Ltd.) | 70 parts by weight |
| Cellulose ester (cellulose acetate propionate at a total substitution degree of an acyl group of 2.7, a substitution degree of an acetyl group of 0.19, a substitution degree of a propionyl group of 2.56, and Mw of 200,000 | 30 parts by weight |
| Methylene chloride | 140 parts by weight |
| Toluene | 200 parts by weight |

Further, the glass transition temperature of prepared optical Film 51 was determined via a differential scanning calorimeter (Type DSC-7, produced by Perkin Elmer Co.). Peaks were detected in two positions at Tg1 of 105° C. and Tg2 of 145° C., and it was noted that acrylic rein (A) and cellulose ester resin (E) were present in a non-compatible state.

TABLE 1

| Optical Film No. | Acrylic Resin (A) | | Cellulose Ester Resin (B) | | | | | | | | | | Composition Ratio (parts by weight) (A/B) | Remarks |
|---|---|---|---|---|---|---|---|---|---|---|---|---|---|---|
| | Acryl Type | Mw | Substitution Degree | | | | | | | | Total Substitution Degree | Mw | | |
| | | | ac | pr | bu | pen | hep | bz | oct | ph | | | | |
| 1 | BR85 | 280000 | 0.19 | 2.56 | — | — | — | — | — | — | 2.75 | 200000 | 70/30 | Inv. |
| 2 | BR85 | 280000 | 0.19 | 2.56 | — | — | — | — | — | — | 2.75 | 200000 | 94/6 | Inv. |
| 3 | BR85 | 280000 | 0.19 | 2.56 | — | — | — | — | — | — | 2.75 | 200000 | 98/2 | Comp. |
| 4 | BR85 | 280000 | 0.19 | 2.56 | — | — | — | — | — | — | 2.75 | 200000 | 52/48 | Inv. |
| 5 | BR85 | 280000 | 0.19 | 2.56 | — | — | — | — | — | — | 2.75 | 200000 | 48/52 | Inv. |
| 6 | BR85 | 280000 | 0.19 | 2.56 | — | — | — | — | — | — | 2.75 | 200000 | 35/65 | Inv. |
| 7 | BR85 | 280000 | 0.19 | 2.56 | — | — | — | — | — | — | 2.75 | 200000 | 27/73 | Comp. |
| 8 | BR85 | 280000 | 0.19 | 2.56 | — | — | — | — | — | — | 2.75 | 70000 | 70/30 | Comp. |
| 9 | BR85 | 280000 | 0.19 | 2.56 | — | — | — | — | — | — | 2.75 | 80000 | 70/30 | Inv. |
| 10 | BR85 | 280000 | 0.19 | 2.56 | — | — | — | — | — | — | 2.75 | 130000 | 70/30 | Inv. |
| 11 | BR85 | 280000 | 0.19 | 2.56 | — | — | — | — | — | — | 2.75 | 180000 | 70/30 | Inv. |
| 12 | BR85 | 280000 | 0.19 | 2.56 | — | — | — | — | — | — | 2.75 | 210000 | 70/30 | Inv. |
| 13 | BR85 | 280000 | 0.19 | 2.56 | — | — | — | — | — | — | 2.75 | 250000 | 70/30 | Inv. |
| 14 | BR85 | 280000 | 0.19 | 2.56 | — | — | — | — | — | — | 2.75 | 320000 | 70/30 | Inv. |
| 15 | BR85 | 280000 | 0.80 | 1.30 | — | — | — | — | — | — | 2.10 | 200000 | 70/30 | Inv. |
| 16 | BR85 | 280000 | 0.80 | 2.00 | — | — | — | — | — | — | 2.80 | 200000 | 70/30 | Inv. |
| 17 | BR85 | 280000 | — | 2.10 | — | — | — | — | — | — | 2.10 | 200000 | 70/30 | Inv. |
| 18 | BR85 | 280000 | — | 1.90 | — | — | — | — | — | — | 1.90 | 200000 | 70/30 | Comp. |
| 19 | BR85 | 280000 | — | 2.89 | — | — | — | — | — | — | 2.89 | 200000 | 70/30 | Inv. |
| 20 | BR85 | 280000 | 1.05 | 1.30 | — | — | — | — | — | — | 2.35 | 200000 | 70/30 | Inv. |
| 21 | BR85 | 280000 | 1.05 | 1.10 | — | — | — | — | — | — | 2.15 | 200000 | 70/30 | Comp. |
| 22 | BR85 | 280000 | 1.40 | 1.50 | — | — | — | — | — | — | 2.90 | 200000 | 70/30 | Inv. |
| 23 | BR85 | 280000 | 2.90 | — | — | — | — | — | — | — | 2.90 | 200000 | 70/30 | Comp. |
| 24 | BR85 | 280000 | 0.50 | 1.70 | — | — | — | — | — | — | 2.20 | 200000 | 70/30 | Inv. |
| 25 | BR85 | 280000 | 0.50 | 2.30 | — | — | — | — | — | — | 2.80 | 200000 | 70/30 | Inv. |

Inv.: Present Invention, Comp.: Comparative Example

TABLE 2

| Optical Film No. | Acrylic Resin (A) Acryl Type | Mw | Cellulose Ester Resin (B) Substitution Degree ac | pr | bu | pen | hep | bz | oct | ph | Total Substitution Degree | Mw | Composition Ratio (parts by weight) (A/B) | Remarks |
|---|---|---|---|---|---|---|---|---|---|---|---|---|---|---|
| 26 | BR85 | 280000 | 0.50 | — | 1.70 | — | — | — | — | — | 2.20 | 200000 | 70/30 | Inv. |
| 27 | BR85 | 280000 | 0.50 | — | 2.30 | — | — | — | — | — | 2.80 | 200000 | 70/30 | Inv. |
| 28 | BR85 | 280000 | 0.50 | — | — | 1.70 | — | — | — | — | 2.20 | 200000 | 70/30 | Inv. |
| 29 | BR85 | 280000 | 0.50 | — | — | — | 1.70 | — | — | — | 2.20 | 200000 | 70/30 | Inv. |
| 30 | BR85 | 280000 | 0.50 | — | — | — | — | 1.70 | — | — | 2.20 | 200000 | 70/30 | Inv. |
| 31 | BR85 | 280000 | 0.50 | — | — | — | — | — | 1.70 | — | 2.20 | 200000 | 70/30 | Comp. |
| 32 | BR85 | 280000 | 0.50 | — | — | — | — | — | — | 1.70 | 2.20 | 200000 | 70/30 | Comp. |
| 33 | BR85 | 280000 | 0.50 | 1.15 | 1.15 | — | — | — | — | — | 2.80 | 200000 | 70/30 | Inv. |
| 34 | BR83 | 40000 | 0.19 | 2.56 | — | — | — | — | — | — | 2.75 | 200000 | 70/30 | Comp. |
| 35 | A1 | 70000 | 0.19 | 2.56 | — | — | — | — | — | — | 2.75 | 200000 | 70/30 | Comp. |
| 36 | MS2 | 100000 | 0.19 | 2.56 | — | — | — | — | — | — | 2.75 | 200000 | 70/30 | Inv. |
| 37 | MS1 | 100000 | 0.19 | 2.56 | — | — | — | — | — | — | 2.75 | 200000 | 70/30 | Inv. |
| 38 | BR80 | 95000 | 0.19 | 2.56 | — | — | — | — | — | — | 2.75 | 200000 | 70/30 | Inv. |
| 39 | 80N | 100000 | 0.19 | 2.56 | — | — | — | — | — | — | 2.75 | 200000 | 70/30 | Inv. |
| 40 | A8 | 130000 | 0.19 | 2.56 | — | — | — | — | — | — | 2.75 | 200000 | 70/30 | Inv. |
| 41 | A2 | 160000 | 0.19 | 2.56 | — | — | — | — | — | — | 2.75 | 200000 | 70/30 | Inv. |
| 42 | A3 | 350000 | 0.19 | 2.56 | — | — | — | — | — | — | 2.75 | 200000 | 70/30 | Inv. |
| 43 | BR88 | 480000 | 0.19 | 2.56 | — | — | — | — | — | — | 2.75 | 200000 | 70/30 | Inv. |
| 44 | A4 | 550000 | 0.19 | 2.56 | — | — | — | — | — | — | 2.75 | 200000 | 70/30 | Inv. |
| 45 | A5 | 800000 | 0.19 | 2.56 | — | — | — | — | — | — | 2.75 | 200000 | 70/30 | Inv. |
| 46 | A6 | 930000 | 0.19 | 2.56 | — | — | — | — | — | — | 2.75 | 200000 | 70/30 | Inv. |
| 47 | A7 | 1100000 | 0.19 | 2.56 | — | — | — | — | — | — | 2.75 | 200000 | 70/30 | Inv. |
| 48 | *1 | 244000 | — | — | — | — | — | — | — | — | — | — | 100/0 | Comp. |
| 49 | BR85 | 280000 | 1.20 | — | 1.50 | — | — | — | — | — | 2.70 | 40000 | 70/30 | Comp. |
| 50 | *2 | 5000 | 2.80 | — | — | — | — | — | — | — | 2.80 | 200000 | 13/87 | Comp. |
| 51 | BR85 | 280000 | 0.19 | 2.56 | — | — | — | — | — | — | 2.75 | 200000 | 70/30 | Comp. |

Inv.: Present Invention, Comp.: Comparative Example, *1: 1A described in Example of JP-A No. 2005-146084 (1A at Patent Document 3), *2: Polymer 1 described in Example of JP-A No. 2003-12859 (Polymer 1 of Patent Document 5)

<<Evaluation Method>>

Resulting Optical Films 1-51 were evaluated as follows.

(Haze: Evaluation of Transparency Resulting in Major Effects to Contrast)

With regard to the film samples prepared as described above, a film sample sheet was evaluated via a haze meter (Type NDH 2000, produced by Nippon Denshoku Industries Co., Ltd.) based on JIS K 7136.

(Tension Softening Point: Evaluation of Heat Resistance)

The following evaluation was carried out employing a TENSIRON tester (RTC-1225A, produced by ORIENTEC Co., Ltd.).

Optical film was cut to 120 mm (longitudinal)×10 mm (vertical). While pulling the resulting sheet under a tension of 10 N, temperature was raised at a rate of 30° C./minute, and temperature which resulted in 9N was determined thrice, followed by calculation of the average.

(Ductile Breaking: Brittleness Evaluation)

Optical film was cut to 100 mm (longitudinal)×10 mm (vertical). The resulting sheet was subjected to one mountain fold and one valley fold in the longitudinal direction in the central portion. The above test was carried out thrice, and evaluation was made based on the following criteria. Incidentally, "fold", as described in the evaluation, means that the sheet is broken up into at least two portions.

A: no fold was noted during three tests

B: at least one fold was noted during three tests (Film Deformation: Evaluation of Heat Resistance During Extended Use)

After each film was allowed to leave in an ambience of 90° C., DRY (relative humidity of at most 5%) for 1,000 hours, the degree of film deformation was visually observed and evaluated based on the following criteria.

A: no film deformation was noted

B: film deformation was noted

C: marked film deformation was noted (Dimensional Change due to Humidity Change: Evaluation of Moisture Resistance)

Two positions on the prepared film were marked (with +) in the casting direction. The marked film was treated at 60° C. and 90% relative humidity for 1,000 hours. Prior to and after the treatment, the distance between the marks (+ marks) was determined via an optical microscope, and evaluation was performed based on the following criteria.

Dimensional change ratio (in %)=[($a1-a2$)/$a1$]×100 wherein "a1" represents the distance prior to treatment, while "a2" represents the distance after treatment.

A: less than 0.3%

B: at least 0.3%-less than 0.5%

C: at least 0.5%

(Cutting Property: Evaluation of Manufacturing Suitability)

Each optical film was torn, via a light load tearing meter (produced by Toyo Seiki Seisaku-sho, Ltd.), and was evaluated based on the following criteria.

A: the torn plane was very smooth, and straight tearing resulted

B: the torn plane resulted in slight weld flash, and tearing resulted in a straight line C: the torn plane resulted in significant weld flash, and tearing resulted in no straight line (Film Appearance: Evaluation of Production Suitability)

Appearance of each of the prepared optical films was visually observed and evaluated based on the following criteria.

A: a very smooth plane was noted

B: slightly stretches, wrinkles, and steps were noticed

C: obvious stretches, wrinkles, and steps were noticed (Evaluation of Characteristic as Liquid Crystal Display Device)

<Preparation of Polarizing Plate>

A polarizing plate, in which each optical film was employed as a polarizing plate protective film, was prepared as follows.

A 120 µm thick polyvinyl alcohol film in a long-length roll was immersed into 100 parts by an aqueous solution incorporating 1 part by weight of iodine and 4 parts by weight of boric acid and was stretched at 50° C. by a factor of 5 in the conveying direction, whereby a polarizing film was prepared.

Subsequently, the above polarizing film, onto which acrylic adhesive agents were applied, was adhered onto the optical film prepared in Example 1, which had been subjected to a corona treatment.

Further, KC8UCR-5, produced by Konica Minolta Opto, Inc., which is a retardation film treated with an alkali saponification treatment, was adhered onto the other side, followed by drying, whereby Polarizing Plate P1 was prepared. In the same manner as above, Polarizing Plates 2-51 were prepared by employing Optical Films 2-51.

Polarizing plates employing each of the optical films of the present invention excelled in film cutting property, resulting in easier treatments.

<Preparation of Liquid Crystal Display Devices>

Display characteristics of optical films were evaluated employing each of the polarizing plats prepared as above.

Polarizing plates on both sides, adhered to 32 type television AQ-32AD5, manufactured by Sharp Corp., were peeled away. Each of the polarizing plates prepared as above was adhered so that KC8UCR-5 was arranged on the glass surface side of the liquid crystal cell and the absorption axis was directed in the same direction of the previously adhered polarizing plate, whereby each of the liquid crystal display devices was prepared.

(View Angle variation: Evaluation of Heat and Moisture Resistance as Polarizing Plate Protective Film)

The following evaluations were carried out employing Liquid Crystal Display Devices 1-51, prepared as above.

The view angle of liquid crystal display devices was determined by employing EZ-CONTRAST 160D, produced by ELDIM Co. in an ambience of 23° C. and 55% relative humidity. Subsequently, the above polarizing plate was allowed to stand at 60° C. and 90% relative humidity over 1,000 hours, and the resulting view angle was determined in the same manner as above. The resulting values were subjected to 3 levels of evaluation based on the following criteria.

A: no view angle variation was noted

B: slight view angle variation was noted

C: significant view angle variation was noted (Color Shift: Evaluation of Heat and Moisture Resistance as Polarizing Plate Protective Film)

With regard to each of Liquid Crystal Display Devices 1-51 prepared as above, the display was subjected to black display and observation was carried out at a skew angle of 45°. Subsequently, the same observation was carried out in the same manner as above for the above plates which had been allowed to stand at 60° C. and 90% relative humidity over 1,000 hours The resulting color shift was evaluated based on the following criteria.

A: no color shift was noted

B: slight color shift was noted

C: significant color shift was noted

Tables 3 and 4 show the evaluation results.

TABLE 3

| Optical Film No. | Haze (%) | Tension Softening Point (° C.) | Ductile Breaking | Dimensional Change | Film Deformation | Cutting Property | Film Appearance | View Angle Variation | Color Shift | Remarks |
|---|---|---|---|---|---|---|---|---|---|---|
| 1 | 0.22 | 121 | A | A | A | A | A | A | A | Inv. |
| 2 | 0.22 | 106 | A | B | B | B | A | B | B | Inv. |
| 3 | 0.22 | 103 | C | C | B | C | A | C | C | Comp. |
| 4 | 0.29 | 131 | A | A | A | A | A | A | B | Inv. |
| 5 | 0.43 | 132 | A | A | A | A | A | B | B | Inv. |
| 6 | 0.56 | 135 | A | A | A | A | A | B | B | Inv. |
| 7 | 1.20 | 136 | A | C | B | A | B | C | C | Comp. |
| 8 | 0.27 | 117 | C | B | A | C | B | A | B | Comp. |
| 9 | 0.28 | 118 | A | B | A | B | B | A | B | Inv. |
| 10 | 0.27 | 119 | A | A | A | A | A | A | A | Inv. |
| 11 | 0.25 | 119 | A | A | A | A | A | A | A | Inv. |

TABLE 3-continued

| | Evaluation of Optical Film | | | | | | | Evaluation of Liquid Crystal Display Device | | |
|---|---|---|---|---|---|---|---|---|---|---|
| Optical Film No. | Haze (%) | Tension Softening Point (° C.) | Ductile Breaking | Dimensional Change | Film Deformation | Cutting Property | Film Appearance | View Angle Variation | Color Shift | Remarks |
| 12 | 0.26 | 120 | A | A | A | A | A | A | A | Inv. |
| 13 | 0.33 | 118 | A | B | A | A | B | A | A | Inv. |
| 14 | 0.52 | 119 | A | A | A | A | B | A | B | Inv. |
| 15 | 0.77 | 125 | A | A | A | B | B | B | B | Inv. |
| 16 | 0.41 | 123 | A | A | A | A | A | A | A | Inv. |
| 17 | 0.84 | 124 | A | A | A | A | B | A | B | Inv. |
| 18 | 1.37 | 125 | A | A | B | C | B | B | B | Comp. |
| 19 | 0.30 | 120 | A | A | A | A | A | A | A | Inv. |
| 20 | 0.81 | 124 | A | A | B | B | B | A | B | Inv. |
| 21 | 1.56 | 121 | C | A | B | C | B | B | B | Comp. |
| 22 | 0.45 | 120 | A | A | A | B | B | B | B | Inv. |
| 23 | 3.70 | 110 | C | B | B | C | C | C | C | Comp. |
| 24 | 0.68 | 123 | A | A | A | A | B | B | B | Inv. |
| 25 | 0.30 | 122 | A | A | A | A | A | A | A | Inv. |

Inv.: Present Invention, Comp.: Comparative Eample

TABLE 4

| | Evaluation of Optical Film | | | | | | | Evaluation of Liquid Crystal Display Device | | |
|---|---|---|---|---|---|---|---|---|---|---|
| Optical Film No. | Haze (%) | Tension Softening Point (° C.) | Ductile Breaking | Dimensional Change | Film Deformation | Cutting Property | Film Appearance | View Angle Variation | Color Shift | Remarks |
| 26 | 0.62 | 115 | A | B | A | A | B | B | B | Inv. |
| 27 | 0.29 | 113 | A | B | A | A | A | A | A | Inv. |
| 28 | 0.58 | 110 | A | B | B | A | A | B | B | Inv. |
| 29 | 0.47 | 106 | A | B | B | A | A | B | B | Inv. |
| 30 | 0.52 | 111 | A | B | B | A | A | B | B | Inv. |
| 31 | 0.39 | 102 | A | C | C | A | A | C | C | Comp. |
| 32 | 3.20 | 110 | C | C | B | C | B | C | C | Comp. |
| 33 | 0.29 | 120 | A | A | A | A | A | A | A | Inv. |
| 34 | 0.32 | 115 | C | B | A | C | A | A | B | Comp. |
| 35 | 0.33 | 116 | C | B | A | C | A | A | B | Comp. |
| 36 | 0.89 | 120 | A | A | B | B | A | B | B | Inv. |
| 37 | 0.48 | 119 | A | A | A | B | A | B | B | Inv. |
| 38 | 0.33 | 119 | A | A | A | B | B | A | B | Inv. |
| 39 | 0.31 | 120 | A | A | A | B | A | A | A | Inv. |
| 40 | 0.47 | 135 | A | A | A | B | A | A | A | Inv. |
| 41 | 0.25 | 121 | A | A | A | A | A | A | A | Inv. |
| 42 | 0.26 | 123 | A | A | A | A | A | A | A | Inv. |
| 43 | 0.35 | 123 | A | A | A | B | A | A | A | Inv. |
| 44 | 0.36 | 123 | A | A | A | B | A | A | A | Inv. |
| 45 | 0.51 | 122 | A | A | A | B | B | A | A | Inv. |
| 46 | 0.64 | 121 | A | A | A | B | B | A | A | Inv. |
| 47 | 0.77 | 121 | A | A | A | B | B | A | A | Inv. |
| 48 | 0.31 | 125 | C | A | A | C | B | A | B | Comp. |
| 49 | 0.35 | 110 | C | B | B | C | A | B | C | Comp. |
| 50 | 0.43 | 136 | A | C | A | B | A | C | C | Comp. |
| 51 | 0.63 | 99 | C | C | B | C | B | C | C | Comp. |

Inv.: Present Invention, Comp.: Comparative Example

As described in Tables 3 and 4, optical films of the present invention exhibited excellent characteristics with regard to hygroscopicity, transparency, heat resistance, and brittleness. Further, polarizing plates and liquid display devices prepared by employing the optical films of the present invention exhibited excellent characteristics with regard to visibility and color shift.

Example 2

Preparation of Acrylic Particles (C1)

Into a reactor vessel of an inner volume of 60 liters, fitted with a reflux cooling device, put were 38.2 liters of ion-exchanged water and 111.6 g of sodium dioctyl sulfosuccinate. While stirring the resulting mixture at a number of rotations of 250 rpm, the temperature was raised to 75° C. under an ambience of nitrogen, whereby a state was formed in which oxygen effects were eliminated. Subsequently, 0.36 g of APS was added and after stirring for 5 minutes, a monomer mixture composed of 1,657 g of MMA, 21.6 g of BA, and 1.68 g of ALMA was totally added. After detecting the heat generation peak, the resulting mixture was maintained for an additional 20 minutes, whereby polymerization of the innermost hard layer was completed.

Subsequently, 3.48 g of APS were put in, and after stirring for 5 minutes, a monomer mixture composed of 8105 g of BA, 31.9 g of PEGDA (200), and 264.0 g of KLMA was continuously added over 120 minutes. After the addition, the resulting mixture was maintained for an additional 120 minutes, whereby polymerization of the soft layer was completed.

Thereafter, 1.32 g of APS were added and after stirring for 5 minutes, a monomer mixture composed of 2,106 g of MMA and 201.6 g of BA was continuously added over 20 minutes. After the addition, the resulting mixture was maintained for an additional 20 minutes, whereby polymerization of Outermost Hard Layer 1 was completed Subsequently, 1.32 g of APS were put in, and after 5 minutes, a monomer mixture composed of 3,148 g of MMA, 201.6 g of BA, and 10.1 g of n-OM was continuously added over 20 minutes. After the addition, the resulting mixture was maintained for an additional 20 minutes, and subsequently, heated to 95° C. and maintained for 60 minutes, whereby polymerization of Outermost Hard Layer 2 was completed.

The polymer latex prepared as above was put in a 3% by weight heated sodium sulfate aqueous solution to result in salting-out and aggregation. Subsequently, after repeated dehydration and washing, drying was carried out, whereby three-layer structured acrylic particles (C1) were prepared. The average particle diameter was determined via an absorbance method, resulting in 100 nm.

Above abbreviations refer to the following materials.

MMA: methyl methacrylate

MA: methyl acrylate

BA: n-butyl acrylate

ALMA: allyl methacrylate

PEGDA: polyethylene glycol diacrylate (at a molecular weight of 200)

n-OM: n-octylmercaptan

APS: ammonium persulfate (Preparation of Optical Film)

<Preparation of Optical Films 38-1-38-6>

| (Dope Liquid Composition) | |
|---|---|
| DIANAL BR80 (produced by Mitsubishi Rayon Co., Ltd.) | 66.5 parts by weight |
| Cellulose ester (cellulose acetate propionate at a total substitution degree of an acyl group of 2.75, a substitution degree of an acetyl group of 0.19, a substitution degree of a propionyl group of 2.56, and Mw of 100,000 | 28.5 parts by weight |
| Acrylic particles (C1), prepared as above | 20 parts by weight |
| Methylene chloride | 300 parts by weight |
| Ethanol | 40 parts by weight |

The above composition was subjected to complete dissolution, while heated, whereby a dope liquid was prepared.

Subsequently, Optical Film 38-1 was prepared via the same manufacturing method as Optical Film 38 described in Example 1.

Optical Films 38-2-38-6 were prepared via the same manufacturing method as Optical Film 38, except that the composition ratio of acrylic resin (A), cellulose ester resin (B), and acrylic particles (C) was changed as listed in Table 5.

Further, in Optical Film 38-5, METABLENE W-341 (produced by Mitsubishi Rayon Co., Ltd.) was employed as C2 instead of Acrylic Particles C1, while in Optical Film 38-6, MR-2G (produced by Soken Chemical & Engineering Co., Ltd.) in a single layer structure was employed as C3.

TABLE 5

| Optical Film No. | Composition Ratio (parts by weight) (A)/(B)/(C) | Acrylic Particles No. | Particle Structure |
|---|---|---|---|
| 38 | 70/30/— | — | — |
| 38-1 | 66.5/28.5/5.0 | C1 | Three-Layer Core/Shell Structure |
| 38-2 | 69.9/29.9/0.2 | C1 | Three-Layer Core/Shell Structure |
| 38-3 | 56.0/24.0/20.0 | C1 | Three-Layer Core/Shell Structure |
| 38-4 | 45.0/20.0/35.0 | C1 | Three-Layer Core/Shell Structure |
| 38-5 | 69.7/29.6/0.7 | C2 | Three-Layer Core/Shell Structure |
| 38-6 | 66.5/28.5/5.0 | C3 | Single Layer Structure |

<<Evaluation>>

Prepared Optical Films 38-1-38-6 were evaluated as described below.

(State of Resins and Particles: Compatibility/Non-Compatibility)

With regard to prepared Optical Film 38-1, 12 g of it was sampled. The resulting sample was re-dissolved while stirring in methychlo/ethanol solvent of the above composition.

After sufficient dissolution/dispersion, filtration was carried out employing MEMBRANE FILTER T010A (produced by ADVANTEC Co.) having a pore diameter of 0.1 μm. Filtered insoluble compounds were sufficiently dried and the weight was measured, resulting in 1.8 g.

Further, the resulting insoluble compounds were re-dispersed into solvents, and the particle size distribution was determined via MALVERN (produced by Malvern Instruments Ltd.), whereby a distribution near the range of 0.10-0.20 μm was found.

Based on the above, it was found that at least 90% by weight of added acrylic particles (C) remained as insoluble compounds and acrylic particles in the optical film were present in a non-compatible state.

Optical Films 38-2-38-6 were similarly determined and the same results as those of Optical Film 38-1 were obtained.

These samples were evaluated in the same manner as Example 1. Table 6 shows the results.

TABLE 6

| Optical Film No. | State of Acrylic Particles | Haze (%) | Tension Softening Point (° C.) | Ductile Breaking | Film Deformation | Cutting Property | Film Appearance | View Angle Variation | Color Shift |
|---|---|---|---|---|---|---|---|---|---|
| | | | | Evaluation of Optical Film | | | | Evaluation of Liquid Crystal Display Device | |
| 38 | — | 0.33 | 119 | A | A | B | B | A | B |
| 38-1 | non-compatible | 0.35 | 118 | A | A | A | A | A | A |
| 38-2 | non-compatible | 0.33 | 119 | A | A | B | B | A | B |
| 38-3 | non-compatible | 0.45 | 112 | A | A | A | B | A | B |
| 38-4 | non-compatible | 0.52 | 110 | A | A | A | B | B | B |
| 38-5 | non-compatible | 0.36 | 117 | A | A | B | A | A | B |
| 38-6 | non-compatible | 0.36 | 117 | A | A | A | B | A | A |

As described above, when minute acrylic particles were added to the optical film of the present invention, even though transparency (haze) is slightly deteriorated, it was possible to further improve the cutting property and appearance of the film as well as to further reduce the view angle variation and color shift of liquid crystal display devices.

Example 3

Optical Films 5-1 and 5-2 were prepared in the same manner as Example 1, except that, during preparation of the dope of Optical Film 5, the following UV absorbers were added, and liquid crystal display devices were prepared in the same manner as Example 1.

| 5-1: | TINUVIN 109 (produced by Ciba Specialty Chemicals Corp.) | 1.5 parts by weight |
| | TINUVIN 171 (produced by Ciba Specialty Chemicals Corp.) | 0.7 part by weight |
| 5-2: | LA-31 (produced by ADEKA Corp.) | 1.5 parts by weight |

The resulting liquid crystal display devices exhibited lower view angle variation and lower color shift.

As described above, when the optical film of the present invention was employed, it was possible to appropriately incorporate the additives which were employed in conventional polarizing plate protective films. Further, polarizing plates and liquid crystal display devices, which were prepared by employing those, exhibited excellent characteristics of visibility and color shift.

What is claimed is:

1. An optical film comprising an acrylic resin (A) and a cellulose ester resin (B), both of which are incorporated in a compatible state having a weight ratio of (A) to (B) is between 95:5 and 30:70,
    wherein a weight average molecular weight Mw of the acrylic resin (A) is 80,000 or more;
    a total substitution degree (T) of acyl groups of the cellulose ester resin (B) is 2.0-3.0;
    the substitution degree (T) of the acyl groups having 3-7 carbon atoms is 1.2-3.0; and
    a weight average molecular weight Mw of the cellulose ester resin (B) is 75,000 or more.

2. The optical film of claim 1, wherein a sum of the substitution degree of the acyl groups having carbon atoms other than the acyl groups having 3-7 carbon atoms of the cellulose ester resin (B) is 1.3 or less.

3. The optical film of claim 1, wherein the sum of the substitution degree of the acyl groups having carbon atoms other than the acyl groups having 3-7 carbon atoms of the cellulose ester resin (B) is 2.00 or more.

4. The optical film of claim 1, wherein the total substitution degree (T) of the acyl groups of the cellulose ester resin (B) is 2.5-3.0.

5. The optical film of claim 1, wherein the acrylic resin (A) comprises methyl methacrylate units of 50-99% by weight in the molecule.

6. The optical film of claim 1, wherein the weight ratio of the acrylic resin (A) to the cellulose ester resin (B) is between 95:5 and 50:50.

7. The optical film of claim 6, wherein the weight ratio of the acrylic resin (A) to the cellulose ester resin (B) is between 80:20 and 60:40.

8. The optical film of claim 1, wherein the weight average molecular weight Mw of the acrylic resin (A) is in the range of 80,000-1,000,000.

9. The optical film of claim 8, wherein the weight average molecular weight Mw of the acrylic resin (A) is in the range of 100,000-500,000.

10. The optical film of claim 9, wherein the weight average molecular weight Mw of the acrylic resin (A) is in the range of 150,000-400,000.

11. The optical film of claim 1, wherein the weight average molecular weight Mw of the cellulose ester resin (B) is in the range of 75,000-300,000.

12. The optical film of claim 11, wherein the weight average molecular weight Mw of the cellulose ester resin (B) is in the range of 100,000-240,000.

13. The optical film of claim 1, comprising acrylic particles (C) of 0.5-30% by weight to the total weight of a resins constituting the film.

14. The optical film of claim 1, having a thickness of 20-200 μm and being used for a protection film of a polarizing plate by being adhered to at least one of the sides of a polarizer with an adhesive layer.

15. A polarizing plate comprising the optical film of claim 1.

16. A liquid crystal display device comprising the optical film of claim 1.

17. A method for producing the optical film of claim 1, comprising a step of:

casting a dope comprising acrylic resin (A)/cellulose ester resin (B) and a solvent.

* * * * *